(12) United States Patent
Fernandez Galmes et al.

(10) Patent No.: US 12,549,947 B2
(45) Date of Patent: Feb. 10, 2026

(54) FIRST NODE, SECOND NODE, FOURTH NODE, FIFTH NODE AND METHODS PERFORMED THEREBY FOR HANDLING INDICATIONS

(71) Applicant: Telefonaktiebolaget LM Ericsson (publ), Stockholm (SE)

(72) Inventors: Juan Manuel Fernandez Galmes, Getafe (ES); Jose Miguel Dopico Sanjuan, Torrelodones (ES); Emiliano Merino Vazquez, Leganés (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 49 days.

(21) Appl. No.: 18/834,726

(22) PCT Filed: Feb. 25, 2022

(86) PCT No.: PCT/EP2022/054776
§ 371 (c)(1),
(2) Date: Jul. 31, 2024

(87) PCT Pub. No.: WO2023/147887
PCT Pub. Date: Aug. 10, 2023

(65) Prior Publication Data
US 2025/0159481 A1 May 15, 2025

(30) Foreign Application Priority Data
Feb. 1, 2022 (EP) .................................... 22382086

(51) Int. Cl.
*H04W 12/08* (2021.01)
(52) U.S. Cl.
CPC ................. *H04W 12/08* (2013.01)

(58) Field of Classification Search
CPC ..................................................... H04W 12/08
See application file for complete search history.

(56) References Cited

U.S. PATENT DOCUMENTS

2022/0060881 A1* 2/2022 Wang ..................... H04L 12/185
2022/0141647 A1* 5/2022 Castellanos Zamora ....................
H04W 8/186
455/418

FOREIGN PATENT DOCUMENTS

WO WO-2020090764 A1 * 5/2020 ............ H04W 12/08
WO 2020146076 A1 7/2020

OTHER PUBLICATIONS

International Search Report and Written Opinion dated Oct. 26, 2022 for International Application No. PCT/EP2022/054776 filed Feb. 25, 2022, consisting of 13 pages.
(Continued)

*Primary Examiner* — Bryan Y Lee
(74) *Attorney, Agent, or Firm* — Weisberg I.P. Law, P.A.

(57) ABSTRACT

A computer-implemented method, performed by a first node. The method is for handling indications. The first node operates in a communications system. The first node receives one or more first indications from a second node operating in the communications system. The one or more first indications may indicate one or more respective authorizations of one or more third nodes to perform one or more actions with a group of devices. The one or more third nodes are different than a fourth node operating in the communications system, the fourth node having created the group of devices. The first node sends, based on the received one or more first indications, one or more second indications to a fifth node operating in the communications system. The one or more second indications indicate to store the one or more respective authorizations.

20 Claims, 12 Drawing Sheets

(56) References Cited

OTHER PUBLICATIONS

3GPP TR 23.724 V16.1.0; 3rd Generation Partnership Project; Technical Specification Group Services and System Aspects; Study on Cellular Internet of Things (CIoT) support and evolution for the 5G System (5GS) (Release 16); Jun. 2019, consisting of 274 pages.

3GPP TS 29.505 V17.5.0; 3rd Generation Partnership Project; Technical Specification Group Core Network and Terminals; 5G System; Usage of the Unified Data Repository services for Subscription Data; Stage 3 (Release 17); Dec. 2021, consisting of 239 pages.

3GPP TR 23.502 V17.3.0; 3rd Generation Partnership Project; Technical Specification Group Services and System Aspects; Procedures for the 5G System (5GS); Stage 2 (Release 17); Dec. 2021, consisting of 727 pages.

3GPP TS 29.503 V17.5.0; 3rd Generation Partnership Project; Technical Specification Group Core Network and Terminals; 5G System; Unified Data Management Services; Stage 3 (Release 17); Dec. 2021, consisting of 466 pages.

\* cited by examiner a)

b)

a)

b)

a)

b)

a)

b)

FIRST NODE, SECOND NODE, FOURTH NODE, FIFTH NODE AND METHODS PERFORMED THEREBY FOR HANDLING INDICATIONS

CROSS-REFERENCE TO RELATED APPLICATIONS

This application is a Submission Under 35 U.S.C. § 371 for U.S. National Stage Patent Application of International Application No.: PCT/EP2022/054776, filed Feb. 25, 2022 entitled "FIRST NODE, SECOND NODE, FOURTH NODE, FIFTH NODE AND METHODS PERFORMED THEREBY FOR HANDLING INDICATIONS," which claims priority to European Application No.: 22382086.1, filed Feb. 1, 2022, entitled "FIRST NODE, SECOND NODE, FOURTH NODE, FIFTH NODE AND METHODS PERFORMED THEREBY FOR HANDLING INDICATIONS," the entireties of both of which are incorporated herein by reference.

TECHNICAL FIELD

The present disclosure relates generally to a first node and methods performed thereby for handling indications. The present disclosure also relates generally to a second node, and methods performed thereby for handling indications. The present disclosure also relates generally to a fourth node, and methods performed thereby for handling indications. The present disclosure further relates generally to a fifth node, and methods performed thereby, for handling indications.

BACKGROUND

Computer systems in a communications network or communications system may comprise one or more network nodes. A node may comprise one or more processors which, together with computer program code may perform different functions and actions, a memory, a receiving port, and a sending port. A node may be, for example, a server. Nodes may perform their functions entirely on the cloud.

The communications system may cover a geographical area which may be divided into cell areas, each cell area being served by a type of node, a network node in the Radio Access Network (RAN), radio network node or Transmission Point (TP), for example, an access node such as a Base Station (BS), e.g. a Radio Base Station (RBS), which sometimes may be referred to as e.g., gNB, evolved Node B ("eNB"), "eNodeB", "NodeB", "B node", or Base Transceiver Station (BTS), depending on the technology and terminology used. The base stations may be of different classes such as e.g., Wide Area Base Stations, Medium Range Base Stations, Local Area Base Stations and Home Base Stations, based on transmission power and thereby also cell size. A cell may be understood to be the geographical area where radio coverage may be provided by the base station at a base station site. One base station, situated on the base station site, may serve one or several cells. Further, each base station may support one or several communication technologies. The telecommunications network may also be comprised network nodes which may serve receiving nodes, such as user equipments, with serving beams.

The standardization organization Third Generation Partnership Project (3GPP) is currently in the process of specifying a New Radio Interface called Next Generation Radio or New Radio (NR) or 5G-Universal Terrestrial Radio Access (UTRA), as well as a Fifth Generation (5G) Packet Core Network, which may be referred to as 5G Core Network (5GC), abbreviated as 5GC.

FIG. 1 is a schematic diagram depicting a particular example of a 5G reference architecture as defined by 3GPP, which may be used as a reference for the present disclosure. An Application Function (AF) 1 may interact with the 3GPP Core Network through a Network Exposure Function (NEF) 2. In case the AF may be trusted, e.g., internal to the network operator, the AF may interact with the 3GPP Core Network directly, with no NEF involved. The NEF 2 may support different functionality, e.g., different Exposure Application Program Interfaces (APIs), e.g., sponsored Data, Quality of Service (QOS), etc. . . . , which may allow a content provider to request policies from the Mobile Network Operator (MNO). A Unified Data Repository (UDR) may store data grouped into distinct collections of subscription-related information: subscription data, policy data, structured data for exposure, and application data. A Unified Data Manager Function (UDM) 3 may generate 3GPP 5G AKA Authentication Vectors, handle user identification handling, support a UE's Serving NF Registration Management, e.g., storing the serving AMF for a UE, storing the serving SMF for a UE's PDU Session, etc., support retrieval of the UE's individual subscription data for slice selection, and handle subscription data for network exposure capabilities applicable to an individual UE or a group of UEs. The Policy Control Function (PCF) 4 may support a unified policy framework to govern the network behavior. Specifically, the PCF 4 may provide Policy and Charging Control (PCC) rules to the Policy and Charging Enforcement Function (PCEF), that is, the Session Management Function (SMF) 5/User Plane function (UPF) 6 that may enforce policy and charging decisions according to provisioned Policy and Charging Control (PCC) rules. The SMF 5 may support different functionalities, e.g., session establishment, modify and release, and policy related functionalities such as termination of interfaces towards policy control functions, charging data collection, support of charging interfaces and control and coordination of charging data collection at the UPF 6. Specifically, the SMF 5 may receive the PCC rules from the PCF 4 and may configure the UPF 6 accordingly through an N4 7 reference point, Packet Flow Control Protocol (PFCP) protocol. The UPF 6 may support handling of user plane traffic based on the rules received from the SMF 5, e.g., packet inspection through Packet Detection Rules (PDRs) and different enforcement actions such as, e.g., traffic steering, QoS, Charging/Reporting through Forwarding Action Rules (FARs), QoS Enforcement Rules (QERs), and/or Usage Reporting Rule (URRs). The PCF 3 may provide policy rules to a UE 8 through the Access and Mobility Function (AMF) 9. The AMF 9 may manage access of the UE 8. For example, when the UE 8 may be connected through different access networks, and mobility aspects of the UE 8. Also depicted in FIG. 1 is a Network Slice Selection Function (NSSF) 10, Network Repository Function (NRF) 10, a Unified Data Management (UDM) 11, an Authentication Server Function (AUSF) 12, a Radio Access Network (RAN) 13, and a Data Network (DN) 14. Each of the NSSF 9, the NEF 2, the NRF 11, the PCF 4, the UDM 3, the AF 1, the AUSF 12, the AMF 9, the SMF 5, the UE 8, the RAN 13, the UPF 6 and the DN 14 may have an interface through which they may be accessed, which as depicted in the Figure, may be, respectively: Nnssf 15, Nnef 16, Nnrf 17, Npcf 18, Nudm 19, Naf 20, Nausf 21, Namf 22, Nsmf 23, N1 24, and N2 25. The RAN 13 may have an interface N3 26 with the UPF 6. The UPF 6 may have an interface N6 27 with the DN 14.

As described in TS 23.502, v. 17.3.0, clause 4.15.6.1, and TS 29.503 v. 17.5.0, clauses 5.6 and 6.5, a given AF may create a group of UEs or devices by means of Parameter Provisioning Service in NEF and UDM. When a group is created and group members, e.g., UEs, are added by the AF, the group may be stored in the UDR, as described in 3GPP TS 29.505, v. 17.5.0. The operator, via Service Level Agreements (SLA) with the AF provider, e.g., an MTC Provider, as known in 3GPP, may need to provision then the proper permissions so that only authorized AFs may be able to manage the newly created group, e.g., to add and/or delete UE members, to monitor events for the created group, etc.

Existing methods for creating a group of UEs in a communications system may have long latencies and be vulnerable to security breaches.

SUMMARY

As part of the development of embodiments herein, one or more challenges with the existing technology will first be identified and discussed.

Given that the creation of a group may be dynamically performed and initiated by the AF, when the group is created, the MTC provider needs to contact the operator to inform about the newly created group, so that the operation, via Operation and Management (O&M), may provision the proper authorization, e.g., list of AF and/or MTC providers allowed, for the different service operations which may be performed on the group. In short, the operator needs to populate the list of AFs and/or MTC providers allowed to manage the group membership and group data, e.g., application descriptors associated to the group, but also needs to populate the list of AFs and/or MTC providers allowed to monitor events for the group, e.g., loss of connectivity for the UEs, location of the UE members, and the network configuration allowed, e.g., periodic registration timer suggested for the UE members of the group.

Until all this is done by the operator, any AF and/or provider may be understood to have full permissions to perform any service operation on the newly created group, e.g., delete the group, or change the membership of the group, given that, in 3GPP, if the list of authorized MTC providers is empty, the group may be understood to be "public". That is, any Application may perform any service operation on the group. This is undesirable since the AF creating the group may then need to ensure that the operator may immediately provision the permissions allocated for the group. Accordingly, the procedure may be understood to be partly automated. However, the part which is not automated may be understood to be critical, due to the security holes it may be understood to create in the whole procedure.

According to the foregoing, it is an object of embodiments herein to improve the handling of group creation in a communications system.

According to a first aspect of embodiments herein, the object is achieved by a computer-implemented method, performed by a first node. The method is for handling indications. The first node operates in a communications system. The first node receives, one or more first indications from a second node operating in the communications system. The one or more first indications indicate one or more respective authorizations of one or more third nodes to perform one or more actions with a group of devices. The one or more third nodes are different than a fourth node operating in the communications system. The fourth node has created the group of devices. The first node also sends, based on the received one or more first indications, one or more second indications to a fifth node operating in the communications system. The one or more second indications indicate to store the one or more respective authorizations.

According to a second aspect of embodiments herein, the object is achieved by a computer-implemented method, performed by the second node. The method is for handling indications. The second node operates in the communications system. The second node receives one or more previous indications from the fourth node operating in the communications system. The one or more previous indications indicate the one or more respective authorizations of the one or more third nodes to perform the one or more actions with the group of devices. The one or more third nodes are different than the fourth node having created the group of devices. The second node also sends, based on the received one or more previous indications, the one or more first indications to the first node operating in the communications system. The one or more first indications indicate the one or more respective authorizations.

According to a third aspect of embodiments herein, the object is achieved by a computer-implemented method, performed by the fifth node. The method is for handling indications. The fifth node operates in the communications system. The fifth node receives the one or more second indications from the first node operating in the communications system. The one or more second indications indicate the one or more respective authorizations of the one or more third nodes to perform the one or more actions with the group of devices. The one or more third nodes are different than the fourth node operating in the communications system. The fourth node has created the group of devices. The fifth node also updates existing data for the group of devices based on the received one or more second indications.

According to a third aspect of embodiments herein, the object is achieved by a computer-implemented method, performed by the fourth node. The method is for handling indications. The fourth node operates in the communications system. The fourth node creates the group of devices. The fourth node also sends the one or more previous indications to the second node operating in the communications system. The one or more previous indications indicate the one or more respective authorizations of the one or more third nodes to perform the one or more actions with the created group of devices. The one or more third nodes are different than the fourth node.

According to a fourth aspect of embodiments herein, the object is achieved by the first node, for handling indications. The first node is configured to operate in the communications system. The first node is further configured to receive the one or more first indications from the second node configured to operate in the communications system. The one or more first indications are configured to indicate the one or more respective authorizations of the one or more third nodes to perform the one or more actions with the group of devices. The one or more third nodes are configured to be different than the fourth node configured to operate in the communications system. The fourth node is configured to have created the group of devices. The first node is further configured to send, based on the received one or more first indications, the one or more second indications to the fifth node configured to operate in the communications system. The one or more second indications are configured to indicate to store the one or more respective authorizations.

According to a fifth aspect of embodiments herein, the object is achieved by the second node, for handling indications. The second node is configured to operate in the communications system. The second node is further configured to receive the one or more previous indications from the fourth node configured to operate in the communications system. The one or more previous indications are configured to indicate the one or more respective authorizations of the one or more third nodes to perform the one or more actions with the group of devices. The one or more third nodes are configured to be different than the fourth node having created the group of devices. The second node is further configured to send, based on the one or more previous indications configured to be received, the one or more first indications to the first node configured to operate in the communications system. The one or more first indications are configured to indicate the one or more respective authorizations.

According to a sixth aspect of embodiments herein, the object is achieved by the fifth node, for handling indications. The fifth node is configured to operate in the communications system. The fifth node is further configured to receive the one or more second indications from the first node configured to operate in the communications system. The one or more second indications are configured to indicate the one or more respective authorizations of the one or more third nodes to perform the one or more actions with the group of devices. The one or more third nodes are configured to be different than the fourth node configured to operate in the communications system. The fourth node has created the group of devices. The fifth node is further configured to update the existing data for the group of devices based on the one or more second indications configured to be received.

According to a seventh aspect of embodiments herein, the object is achieved by the fourth node, for handling indications. The fourth node is configured to operate in the communications system. The fourth node is further configured to create the group of devices. The fourth node is also configured to send the one or more previous indications to the second node configured to operate in the communications system. The one or more previous indications are configured to indicate the one or more respective authorizations of the one or more third nodes to perform the one or more actions with the group of devices configured to be created. The one or more third nodes are configured to be different than the fourth node.

By obtaining the one or more first indications, the first node may be enabled to then send the one or more second indications. By sending the one or more second indications, the first node may be enabled to then update profile data for the created group of devices with the indicated one or more respective authorizations for the one or more third nodes. This may enable to automate the process of authorizing the one or more third nodes for performing the one or more operations with the group of devices and may be understood to provide a two-fold advantage. As a first advantage, the operator may no longer need to, for example, handshake Service Level Agreements (SLAs) and synchronize with the creator of the group, the fourth node, when creating the group of devices, in order to manually configure the permissions associated with the new group of devices, e.g., a new 5G VN group. Instead, automation may be applied following instructions by the fourth node. The first node may auto-provision the required permissions for the group creator and the one or more third nodes, that is, additional providers, allowed to perform certain operations, namely, the one or more operations.

As a second advantage, the updating of the profile data for the created group of devices may be enabled to be performed in "one shot", without requiring intervention by the operator having authorized the one or more respective authorizations, which as a result, may be understood to eliminate or reduce the gap or security hole in dynamic group creation, reducing the possibility that any malicious AF may hijack and/or manipulate the group of devices or even delete the group.

By the fourth node creating the group of devices and the sending the one or more previous indications indicating the one or more respective authorizations of the one or more third nodes to the second node, the fourth node 114 is enabled to create the group of devices with the proper permissions in an automated manner, and e.g., from the very moment of the group creation. As explained above, advantageously the operator does not need to handshake SLAs and synchronize with the fourth node when creating the group of devices to manually configure the permissions associated to a new 5G VN group. Instead, automation may be applied following instructions by the fourth node.

By the second node receiving the one or more previous indications from the fourth node and sending the one or more first indications to the first node, the first node may be enabled to auto-provision the required permissions for the one or more third nodes allowed to perform certain operations.

By the fifth node receiving the one or more second indications from the first node and updating the existing data for the group of devices based on the received one or more second indications, the complete automation of the group of devices, including permissions and/or authorization of the group of devices, without the need of any administrative task taken by the operator may be enabled. As an additional advantage, the gap or security hole in dynamic group creation may also be enabled to be filled.

BRIEF DESCRIPTION OF THE DRAWINGS

Examples of embodiments herein are described in more detail with reference to the accompanying drawings, according to the following description.

DETAILED DESCRIPTION

Certain aspects of the present disclosure and their embodiments address one or more of the challenges identified with the existing methods and provide solutions to the challenges discussed.

Embodiments herein may relate to automation in 5G Virtual Network (VN) group authorization. As a summarized overview, embodiments herein may be understood to provide a method whereby an AF may perform dynamic provisioning of authorization information for a 5G VN group using an exposure Application Programming Interface (API), indicating additional AFs/MTC providers that may manage the group, and operations allowed for each AF and/or MTC provider.

According to embodiments herein, several service operations may be defined to allow a UDM to dynamically, via traffic interfaces, not provisioning interfaces, populate the permissions, e.g., MTC provider list, for each operation applicable for the group, e.g., group membership, event exposure for the group. These new services operations and/or APIs may be invoked by the UDM and served by a UDR.

New options in existing operation used by an AF, e.g., in the parameter provisioning operation, may be added according to embodiments herein in order to allow the AF, at group creation, to indicate which may be the permissions for the group-related operations. By default, the AF creating the group may be assumed to have full permissions, similar to super-user, or root administrator, and it may include additional providers with their specific service operations allowed, e.g., MTC provider X may be allowed to monitor events on the group/UE members, whereas MTC provider Y may be allowed to monitor events on the group and add/delete members of the group.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments. All possible combinations are not described to simplify the description.

Figure 1:
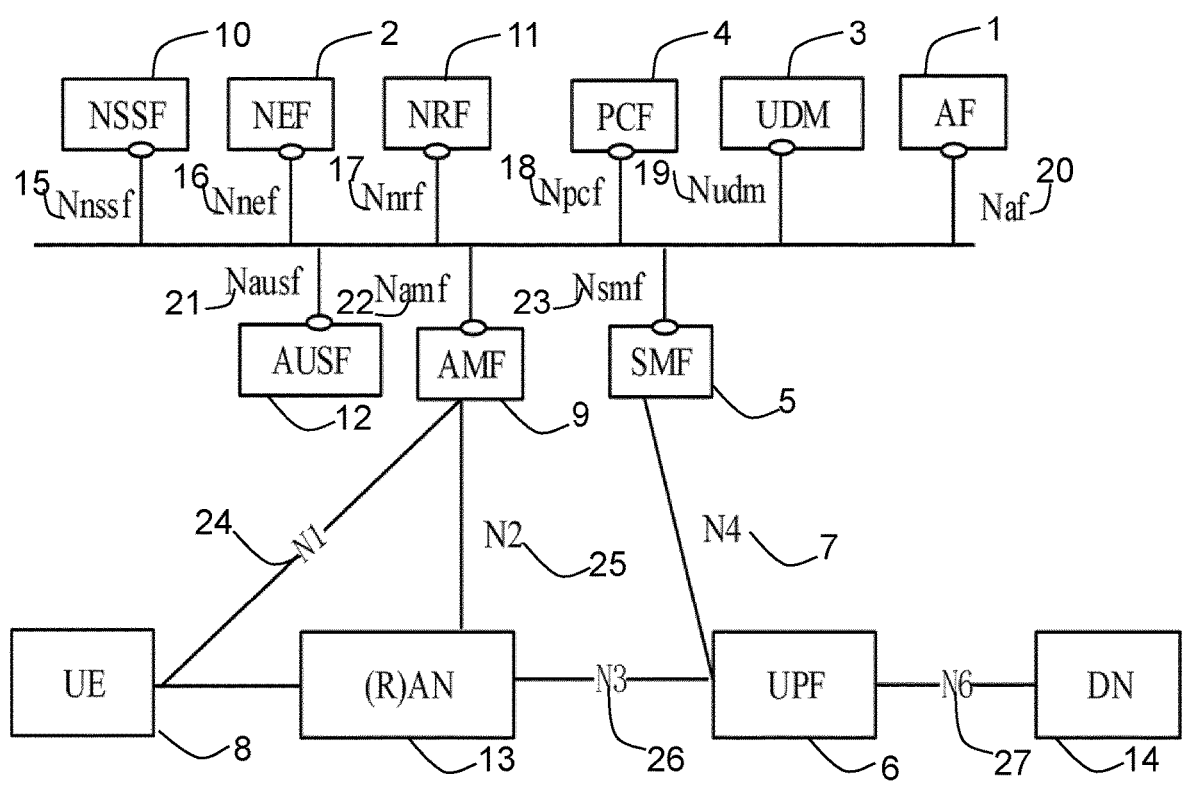
FIG. 1 is a schematic diagram illustrating a non-limiting example of a 5G Network Architecture, non-roaming, according to existing methods.
Figure 2:
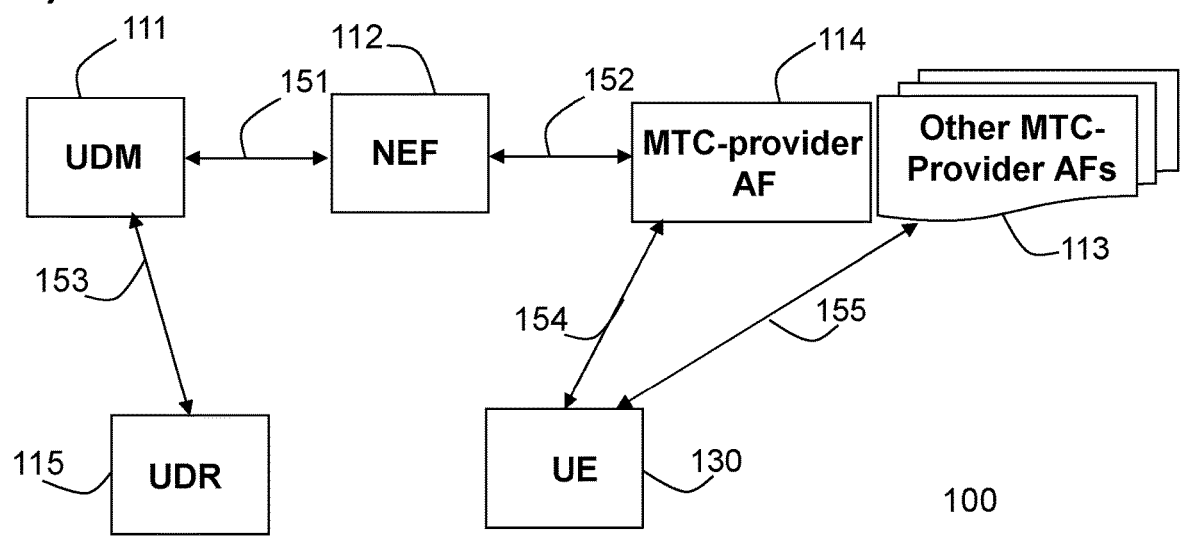
FIG. 2 is a schematic diagram illustrating a non-limiting example of a communications system, according to embodiments herein.
Figure 2:
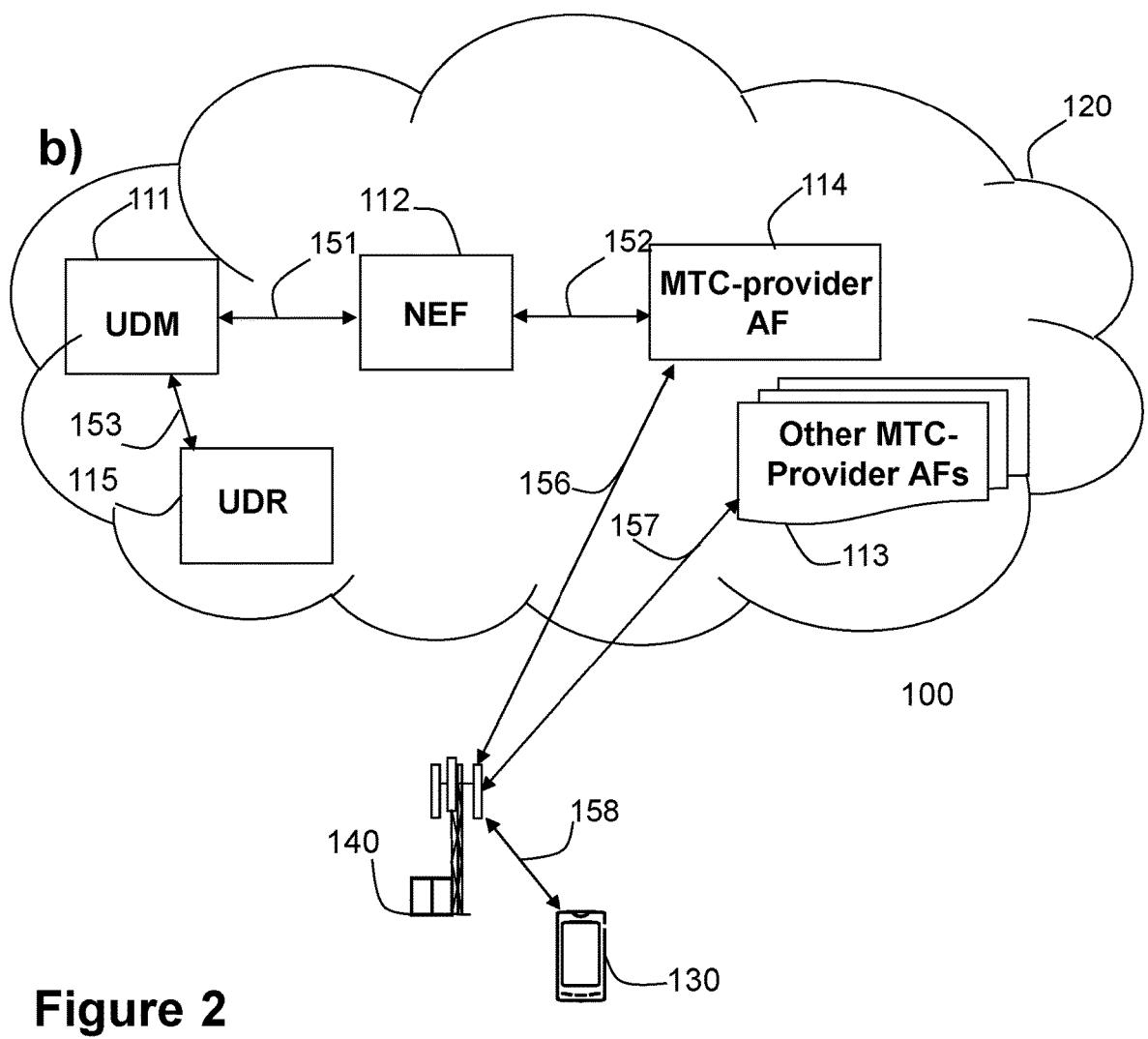

FIG. 2 depicts two non-limiting examples, in panels "a" and "b", respectively, of a communications system 100, in which embodiments herein may be implemented. In some example implementations, such as that depicted in the non-limiting example of FIG. 2a, the communications system 100 may be a computer network. In other example implementations, such as that depicted in the non-limiting example of FIG. 2b, the communications system 100 may be implemented in a telecommunications system, sometimes also referred to as a telecommunications network, cellular radio system, cellular network, or wireless communications system. In some examples, the telecommunications system may comprise network nodes which may serve receiving nodes, such as wireless devices, with serving beams.

In some examples, the telecommunications system may for example be a network such as a 5G system, or a newer system supporting similar functionality. The telecommunications system may also support other technologies, such as a Long-Term Evolution (LTE) network, e.g., LTE Frequency Division Duplex (FDD), LTE Time Division Duplex (TDD), LTE Half-Duplex Frequency Division Duplex (HD-FDD), or LTE operating in an unlicensed band, Wideband Code Division Multiple Access (WCDMA), UTRA TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system. The telecommunications system may for example support a Low Power Wide Area Network (LP-WAN). LPWAN technologies may comprise Long Range physical layer protocol (LoRa), Haystack, SigFox, LTE-M, and Narrow-Band IoT (NB-IoT).

The communications system 100 may comprise a plurality of nodes, and/or operate in communication with other nodes, whereof a first node 111, a second node 112, a one or more third nodes 113, a fourth node 114, and a fifth node 115, are depicted in FIG. 2. It may be understood that the communications system 100 may comprise more nodes than those represented on FIG. 2. For example, in some non-limiting examples, the communications system 100 may comprise a sixth node, which is not depicted in FIG. 2.

Any of the first node 111, the second node 112, the one or more third nodes 113, the fourth node 114 and the fifth node 115 may be understood, respectively, as a first computer system, a second computer system, a third computer system, a fourth computer system and a fifth computer system. In some examples, any of the first node 111, the second node 112, the one or more third nodes 113, the fourth node 114 and the fifth node 115 may be implemented as a standalone server in e.g., a host computer in the cloud 120, as depicted in the non-limiting example depicted in panel b) of FIG. 2. Any of the first node 111, the second node 112, the one or more third nodes 113, the fourth node 114 and the fifth node 115 may in some examples be a distributed node or distributed server, with some of their respective functions being implemented locally, e.g., by a client manager, and some of its functions implemented in the cloud 120, by e.g., a server manager. Yet in other examples, any of the first node 111, the second node 112, the one or more third nodes 113, the fourth node 114 and the fifth node 115 may also be implemented as processing resources in a server farm.

Any of the first node 111, the second node 112, the one or more third nodes 113, the fourth node 114 and the fifth node 115 may be independent and separate nodes. Any of the first node 111, the second node 112, and the fifth node 115 may be co-localized or be the same node.

In some examples of embodiments herein, the first node 111 may be understood as a node that may have a capability to handle user identification, and support retrieval of individual or group subscription data for a device, according to embodiments herein. As depicted in the non-limiting example of FIG. 2, a non-limiting example of the first node 111, wherein the communications system 100 may be a 5G network, may be UDM.

The second node 112 may be a node having a capability to expose one or more services available at the communications system 100. In some particular examples wherein the communications system 100 may be a 5G network, the second node 112 may be a NEF operating in the communications system 100. This is depicted in the non-limiting example of FIG. 2 for illustrative purposes only.

Any of the one or more third nodes 113 may be a node having a capability to provide a service to a device, such as any of the devices 130, in the communications system 100. In some particular examples, any of the one or more the third nodes 113 may be an AF, e.g., in a 5G network.

The fourth node 114 may be a node having a same capability as any of the third nodes 113. The fourth node 114 may be understood to be different from any of the one or more third nodes 113. In the non-limiting example of FIG. 2, the fourth node 114 is the AF of an MTC-provider, which may be understood to be for illustrative purposes only, and the one or more third nodes 113 are the AFs of other MTC-providers, that is, other AFs.

The fifth node 115 may be a node having a capability to store data, e.g., grouped into distinct collections of subscription-related information, such as subscription data, policy data, structured data for exposure, and application data. In some particular examples wherein the communications system 100 may be a 5G network, the fifth node 115 may be a UDR. This is depicted in the non-limiting example of FIG. 2 for illustrative purposes only.

The communications system 100 may comprise a plurality of devices 130 represented in FIG. 2 with a single device. Any of the devices 130 may be also known as e.g., user equipment (UE), a wireless device, mobile terminal, wireless terminal and/or mobile station, mobile telephone, cellular telephone, or laptop with wireless capability, an Internet of Things (IoT) device, sensor, or a Customer Premises Equipment (CPE), just to mention some further examples. Any of the devices 130 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet, a Machine-to-Machine (M2M) device, an Internet of Things (IoT) device, e.g., a sensor or a camera, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the communications system 100. The device 130 may be wireless, i.e., it may be enabled to communicate wirelessly in the communications system 100 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the communications system 100. In the non-limiting example of FIG. 2, the plurality of devices 130 may be a plurality of UEs, which may be understood to be for illustrative purposes only The communications system 100 may comprise one or more radio network nodes, whereof a radio network node 140 is depicted in FIG. 2b. The radio network node 140 may typically be a base station or Transmission Point (TP), or any other network unit capable to serve a wireless device or a machine type node in the communications system 100. The radio network node 140 may be e.g., a 5G gNB, a 4G eNB, or a radio network node in an alternative 5G radio access technology, e.g., fixed or WiFi. The radio network node 140 may be e.g., a Wide Area Base Station, Medium Range Base Station, Local Area Base Station and Home Base Station, based on transmission power and thereby also coverage size. The radio network node 140 may be a stationary relay node or a mobile relay node. The radio network node 140 may support one or several communication technologies, and its name may depend on the technology and terminology used. The radio network node 140 may be directly connected to one or more networks and/or one or more core networks.

The communications system 100 covers a geographical area which may be divided into cell areas, wherein each cell area may be served by a radio network node, although, one radio network node may serve one or several cells.

The first node 111 may communicate with the second node 112 over a first link 151, e.g., a radio link or a wired link. The second node 112 may communicate with the fourth node 114 over a second link 152, e.g., a radio link or a wired link. The first node 111 may communicate with the fifth node 115 over a third link 153, e.g., a radio link or a wired link. The fourth node 114 may communicate, directly or indirectly, with the devices 130 over a respective fourth link 154, e.g., a radio link or a wired link. The one or more third nodes 113 may communicate, directly or indirectly, with the devices 130 over a respective fifth link 155, e.g., a radio link or a wired link. The fourth node 114 may communicate, directly or indirectly with the radio network node 140 over a sixth link 156, e.g., a radio link or a wired link. The radio network node 140 may communicate with the device 130 over a seventh link 157, e.g., a radio link. The one or more third nodes 113 may communicate with the radio network node 140 over a respective seventh link 157, e.g., a radio link. The radio network node 140 may communicate, directly or indirectly, with the devices 130 over a respective eighth link 158, e.g., a radio link or a wired link.

Any of the respective first link 151, the second link 152, the third link 153, the fourth link 154, the fifth link 155, the sixth link 156, the seventh link 157 and/or the eighth link 158 may be a direct link or it may go via one or more computer systems or one or more core networks in the communications system 100, or it may go via an optional intermediate network. The intermediate network may be one of, or a combination of more than one of, a public, private or hosted network; the intermediate network, if any, may be a backbone network or the Internet, which is not shown in FIG. 2.

In general, the usage of "first", "second", "third", "fourth", "fifth", "sixth", "seventh" and/or "eighth" herein may be understood to be an arbitrary way to denote different elements or entities and may be understood to not confer a cumulative or chronological character to the nouns these adjectives modify.

Although terminology from Long Term Evolution (LTE)/5G has been used in this disclosure to exemplify the embodiments herein, this should not be seen as limiting the scope of the embodiments herein to only the aforementioned system. Other wireless systems support similar or equivalent functionality may also benefit from exploiting the ideas covered within this disclosure. In future telecommunication networks, e.g., in the sixth generation (6G), the terms used herein may need to be reinterpreted in view of possible terminology changes in future technologies.

Embodiments of a computer-implemented method, performed by the first node 111, will now be described with reference to the flowchart depicted in FIG. 3. The method may be understood to be for handling indications. The first node 111 operates in the communications system 100.

Several embodiments are comprised herein. The method may comprise one or more of the following actions. In some embodiments, all the actions may be performed. In some embodiments, two or more actions may be performed. It should be noted that the examples herein are not mutually exclusive. One or more embodiments may be combined, where applicable. All possible combinations are not described to simplify the description.

Components from one embodiment may be tacitly assumed to be present in another embodiment and it will be obvious to a person skilled in the art how those components may be used in the other exemplary embodiments. A non-limiting example of the method performed by the first node 111 is depicted in FIG. 3.

Figure 3:
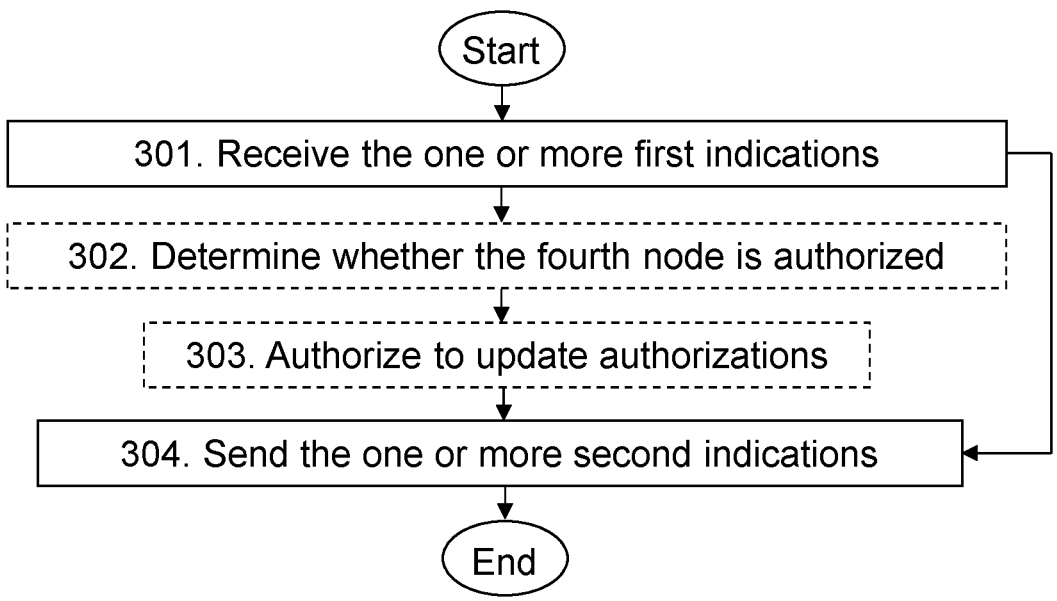
FIG. 3 is a flowchart depicting embodiments of a method in a first node, according to embodiments herein.

In FIG. 3, optional actions are represented with dashed lines.

Action 301

During the course of operations in the communications system 100, the fourth node 114, e.g., an AF belonging to an MTC provider, e.g., car maker A, may create a group of devices 130, e.g., a group of self-driving cars as a car fleet, in the communications system 100. The fourth node 114 may, for example, add two group members, e.g., two UEs embedded in each of the cars in the car fleet, as part of the group of devices 130. The creation of the group of devices 130 may be performed as described in TS 23.502, v. 17.3.0. The fourth node 114 may send a request to create the group of devices 130 to the second node 112, a NEF.

In the group creation request, the fourth node 114 may comprise group data. As part of the group data, the fourth node 114 may include new information, which may be referred to herein as group authorization data, which may indicate the one or more third nodes 113. That is, additional MTC Providers, e.g., MTC provider 2→a search engine provider, and MTC Provider 3→movie provider, with certain permissions to manage the group of devices 130. That is, in the same group creation request, the fourth node 114 may additionally add, according to embodiments herein, the group authorization data information, which may include permissions per MTC provider and per service operation. The request from the fourth node 114 may be understood to intend to provide other providers, in addition to MTC provider 1→car maker A with some permissions for operations targeting the group of devices 130. Hence, car maker A, as the group creator, may be understood to have all permissions, whereas the search engine provider and the movie provider may be provided with one or more respective authorizations to perform one or more actions with a group of devices 130. That is, certain permissions for the devices in the group of devices 130. The one or more actions may comprise at least one of: administering the group of devices 130, configuring the group of devices 130 and monitoring events of the group of devices 130. For example, the search engine provider may be allowed for event monitoring of the group of devices 130 but may not be allowed to modify the membership of the group of devices 130, or the network configuration of the group of devices 130; the movie provider may be allowed for event monitoring of the group of devices 130, to modify the group membership and the network configuration of the group of devices 130.

In this Action 301, the first node 111 receives, one or more first indications from the second node 112 operating in the communications system 100. The one or more first indications indicate the one or more respective authorizations of one or more third nodes 113 to perform the one or more actions with the group of devices 130. The one or more third nodes 113 are different than the fourth node 114 operating in the communications system 100. The fourth node 114 has created the group of devices 130.

The receiving of the of the one or more first indications may be performed e.g., via the first link 151.

The one or more first indications may include an identifier for the fourth node 114, e.g., the MTC provider for car maker A, e.g., based on an AF ID.

At least one of the one or more first indications may indicate respective actions, of the one or more actions, the one or more third nodes 113 may be respectively authorized to perform. In some examples, a single first indication may be received in this Action 301, which may indicate all the one or more third nodes 113 and the respective actions the one or more third nodes 113 may be authorized to perform.

In some examples, at least one of the one or more first indications may indicate a creation of the group of devices 130, e.g., by including an identifier of the group of devices 130 as an "External-Group-Id".

At least one of the one or more first indications may indicate an identity of the members of the group of devices 130, e.g., with their respective UE identifier, as UE-1, UE-2, etc.

In some embodiments, the first node 111 may be a UDM, node, the second node 112 may be a NEF, the fourth node 114 may be an AF of an MTC provider, the one or more third nodes 113 may be one or more other AFs of MTC providers. In some particular embodiments, each of the one or more first indications may be a Nudm_parameterProvision_Create message or a Nudm_ParameterProvision_Update message.

As a particular non-limiting example, the first node 111 receive, in this Action 301, a Nudm_parameter Provision_Create message which may comprise: a) the identifier of the group of devices 130, e.g., as an "External-Group-Id", b) an identifier of a data network providing e.g., operator services, Internet access or third party services, e.g., as a Data Network Name (DNN), c) an identifier of a corresponding network slice, e.g., as a Single Network Slice Selection Assistance information (S-NSSAI), d) the identity of the members of the group of devices 130, e.g., UE members: UE-1, UE-2, e) an identity of the fourth node 114, e.g., MTC-Provider-1, and f) the one or more respective authorizations of the one or more third nodes 113 to perform respective actions, of the one or more actions, with the group of devices 130 as Group Authorization Data, e.g., MTC-provider-2→allowed operations: group membership, event exposure, network configuration), MTC-provider-3→allowed operations: event exposure.

The receiving in this Action 301 of the one or more indications may be made with the proviso the second node 112 may have authorized the request from the fourth node 114 as usual, after having checked that the fourth node 114 is allowed to create groups.

In addition, according to embodiments herein, the receiving in this Action 301 of the one or more indications may be made with the proviso that the second node 112 may have further authorized, according to embodiments herein, that the fourth node 114 may be allowed to add group authorization data for dynamic and/or automated permissions. That is, that the fourth node 114, as the creator of the group of devices 130, may be allowed to add more permissions than the default permissions for car maker A.

By obtaining the one or more first indications in this Action 301, the first node 111 may be enabled to then update profile data for the created group of devices 130 with the indicated one or more respective authorizations for the one or more third nodes 113. This may enable to automate the process of authorizing the one or more third nodes 113 for performing the one or more operations with the group of devices 130 and may be understood to provide a two-fold advantage. As a first advantage, the operator may no longer need to handshake Service Level Agreements (SLAs) and synchronize with MTC-Provider-1 when creating the group of devices 130, in order to manually configure the permissions associated with the new group of devices 130, e.g., a new 5G VN group. Instead, automation may be applied following instructions by the fourth node 114, and the first node 111 may auto-provision the required permissions for the group creator and the one or more third nodes 113, that is, additional providers, allowed to perform certain operations, namely, the one or more operations.

As a second advantage, the updating of the profile data for the created group of devices 130 may be enabled to be performed in "one shot", without requiring intervention by the operator having authorized the one or more respective authorizations, which as a result, may be understood to eliminate or reduce the gap or security hole in dynamic group creation, reducing the possibility that any malicious AF may hijack and/or manipulate the group of devices 130 or even delete the group.

Action 302

As stated earlier, the one or more respective authorizations may originate from the fourth node 114 operating in the communications system 100. In this Action 302, the first node 111 may determine whether or not the fourth node 114 may be authorized to update authorizations, specifically, for the group of devices 130.

This Action 302 may be understood to be performed after receiving the one or more first indications in Action 301.

By determining whether or not the fourth node 114 may be authorized to update authorizations for the group of devices 130 in this Action 302, the first node 111 may be enabled to ensure that any update to the profile data for the created group of devices 130 may be only performed by authorized parties, that is, securely.

Action 303

With the proviso the fourth node 114 is determined to be authorized to update authorizations for the group of devices 130, the first node 111 may, in this Action 303, authorize to update authorizations for the group of devices 130 with the one or more respective authorizations.

Action 304

In this Action 304, the first node 111 sends, based on the received one or more first indications, one or more second indications to the fifth node 115 operating in the communications system 100. The one or more second indications may indicate to store the one or more respective authorizations.

The sending, in this Action 304 may be performed e.g., via the third link 153.

In some embodiments, the one or more second indications may be sent with the proviso the one or more respective authorizations are authorized.

The sending in this Action 304 of the one or more second indications may be performed without intervention of the operator having authorized the one or more respective authorizations. That is, within the time period of the creation of the group of devices 130, wherein the time period may lack the intervention of the operator having authorized the one or more respective authorizations. This may enable that the updating of the profile data for the created group of devices 130 may be enabled to be performed in one shot, without requiring intervention by the operator having authorized the one or more respective authorizations, which as a result, may be understood to eliminate or reduce the gap or security hole in dynamic group creation, reducing the possibility that any malicious AF may hijack and/or manipulate the group of devices 130 or even delete the group.

In some embodiments, the sending in this Action 304 may further comprise sending one or more third indications to the fifth node 115. The one or more third indications may indicate one or more authorizations of the fourth node 114 with the group of devices 130. That is, the authorizations of the creator of the group of devices 130. By sending the one or more third indications, the first node 111 may add the provider creating the group to the list of allowed providers for all possible operations for the group, e.g., event exposure, network configuration, group membership, etc. This may be performed by the first node 111 by means of new traffic, and not O&M service operations towards the fifth node 115, so that, at the time of group creation, the fourth node 114, e.g., the AF initiating the procedure, may be the only one allowed to manage the group of devices 130.

In particular embodiments, at least one of the following may apply. According to a first option, at least one of the one or more first indications or the second indications may indicate the creation of the group of devices 130, e.g., by an External-Group-Id. According to a second option, at least one of the one or more first indications or the one or more second indications may indicate the identity of the members of the group of devices 130, e.g., UE members: UE-1, UE-2. According to a third option, at least one of the one or more first indications may indicate respective actions, of the one or more actions, the one or more third nodes 113 may be respectively authorized to perform. According to a fourth option, each of the one or more second indications may indicate a respective action, of the respective actions, and respective one or more third nodes 113 authorized to perform the respective action, e.g., MTC-provider-2→allowed operations: group membership, event exposure, network configuration), MTC-provider-3→allowed operations: event exposure.

In some embodiments, at least one of the following may apply. According to a first option, the first node 111 may be a UDM node, the second node 112 may be a NEF, the fourth node 114 may be an AF of an MTC provider, the one or more third nodes 113 may be one or more other Application Functions (AFs), or MTC providers, and the fifth node 115 may be a UDR. Accordingly, in this Action 304, the UDM may stores the group information in the UDR.

According to a second option, each of the one or more first indications may be a Nudm_parameterProvision_Create message or a Nudm_ParameterProvision_Update message. According to a third option, each of the one or more second indications may be a Nudr_Group_Data_Update or a Nudr_DataRepository_Update message.

To store the one or more respective authorizations may comprise to update existing data for the group of devices 130 at the fifth node 115. As a non-limiting example of this Action 304, the first node 111, a UDM, may store 5G-VN group data in the fifth node 115, a UDR.

The data stored may exclude the Group Authorization data from being stored as part of the Group Data as such, since the one or more authorizations, and/or the one or more respective authorizations, may be understood to not be part of the Group Data as such, which may comprise DNN, NSSAI, and UE group members, but part of the authorized MTC providers for the group of devices 130

Since the fourth node 114 may have included the Group Authorization Data, the first node 111 may add the related data on each type of authorization, this is, for Group Membership. The first node 111 may update the 5G VN Group Profile Data by sending an Operation: Nudr_Group_Data_update (Pp5gVnGroupprofileData) message, adding MTC-Provider-1 and MTC-Provider-2 as allowed providers, e.g., by indicating "allowedMTcProviders=MTC-Provider-1, MTC-Provider_2".

For event exposure, the first node 111 may update the Event Exposure Group Profile Data by sending an Operation: Nudr_Group_Data_Update (EeGroupPorfileData) message adding MTC-Provider-1, MTC-Provider-2 and MTC-Provider-3 as allowed providers, e.g., by indicating "allowedMTcProviders=MTC-Provider-1, MTC-Provider_2, MTC-Provider_3".

For network configuration, the first node 111 may update Network Configuration Profile Data by sending an Operation: Nudr_Group_Data_Update (PpNetworkConfigurationGroupProfileData) message adding MTC-Provider-1 and MTC-Provider-2 as allowed providers, e.g., by indicating "(allowedMTcProviders=MTC-Provider-1, MTC-Provider_2)".

The first node 111 may therefore additionally, fetch the new group authorization data as indicated by the fourth node 114, and add the one or more third nodes 113, e.g., a list of providers, authorized to the related service operations. This may be performed by invoking the new service operations offered by the fifth node 115 as traffic operations, not O&M operations mentioned earlier.

Since the first node 111 may have received Group Authorization Data, the new information defined in embodiments herein, the first node 111 may build the list of Providers authorized for each related data, e.g., 5G VN group data to add/remove UE members, event exposure data to monitor events, parameter provisioning to set network configuration, according to the information included by the fourth node 114 in one or more previous indications sent to the second node 112. Hence, the first node 111 may firstly add, by using a new service operation defined in embodiments herein-→Nudr_Group_Data_Update car maker A and search engine provider as allowed to manage 5G VN group data (Pp5gVnGroupProfileData), i.e., allowed to add/remove UE members for the group. The first node 111 may secondly add in a same new service operation Nudr_Group_Data_Update car maker A, search engine provider and movie provider as allowed MTC providers for event exposure. Last, the first node 111 may add again, with a same new service operation Nudr_Group_Data_Update, car maker A and search engine provider as allowed for network configuration.

The result may be understood to be that fourth node 114 may have created the group of devices 130 with the proper permissions from the very moment of the group creation and in an automated manner.

Similarly, to the advantages that were described for Action 301, by sending the one or more second indications in this Action 304, the first node 111 may be enabled to then update profile data for the created group of devices 130 with the indicated one or more respective authorizations for the one or more third nodes 113. This may enable to automate the process of authorizing the one or more third nodes 113 for performing the one or more operations with the group of devices 130 and may be understood to provide a two-fold advantage. As a first advantage, the operator may no longer need to handshake Service Level Agreements (SLAs) and synchronize with MTC-Provider-1 when creating the group of devices 130, in order to manually configure the permissions associated with the new group of devices 130, e.g., a new 5G VN group. Instead, automation may be applied following instructions by the fourth node 114, and the first node 111 may auto-provision the required permissions for the group creator and the one or more third nodes 113, that is, additional providers, allowed to perform certain operations, namely, the one or more operations.

As a second advantage, the updating of the profile data for the created group of devices 130 may be enabled to be performed in "one shot", without requiring intervention by the operator having authorized the one or more respective authorizations, which as a result, may be understood to eliminate or reduce the gap or security hole in dynamic group creation, reducing the possibility that any malicious AF may hijack and/or manipulate the group of devices 130 or even delete the group.

Figure 4:
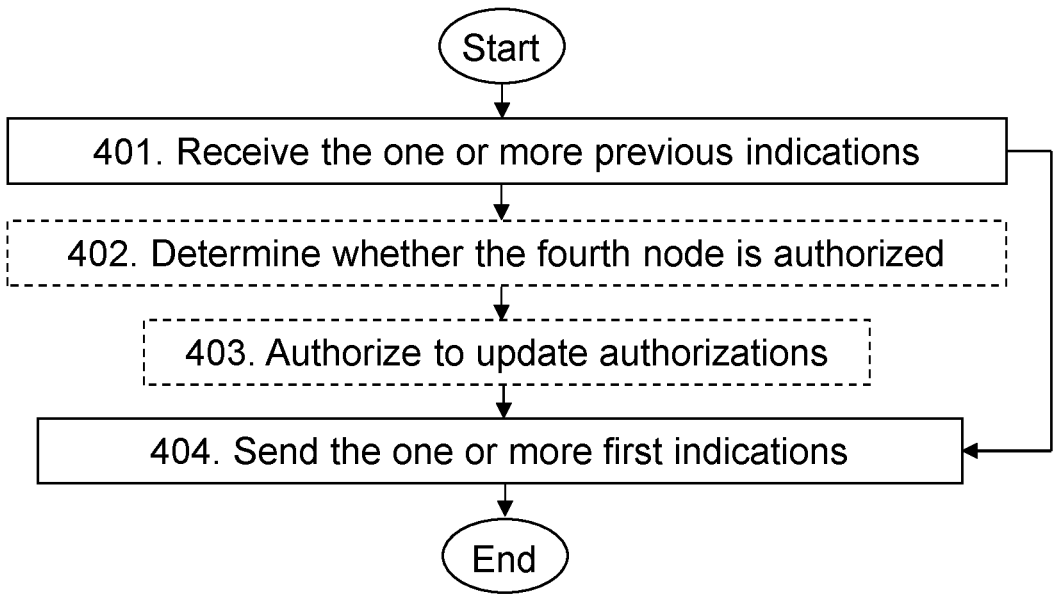
FIG. 4 is a flowchart depicting embodiments of a method in a second node, according to embodiments herein.

Embodiments of a computer-implemented method performed by the second node 112, will now be described with reference to the flowchart depicted in FIG. 4. The method may be understood to be for handling indications. The second node 112 operates in the communications system 100.

The method may comprise the following actions. Several embodiments are comprised herein. In some embodiments, the method may comprise all actions. In other embodiments, the method may comprise two or more actions. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are depicted with dashed lines.

The detailed description of some of the following corresponds to the same references provided above, in relation to the actions described for the first node 111 and will thus not be repeated here to simplify the description. For example, the first node 111 may be a UDM node, the second node 112 may be a NEF, the fourth node 114 may be an AF of an MTC provider, and the one or more third nodes 113 may be one or more other AFs of MTC Providers.

Action 401

In this Action 401, the second node 112 receives one or more previous indications from the fourth node 114 operating in the communications system 100. The one or more previous indications indicate the one or more respective authorizations of the one or more third nodes 113 to perform the one or more actions with the group of devices 130. The one or more third nodes 113 are different than the fourth node 114 having created the group of devices 130.

The receiving in this Action 401 may be performed e.g., via the second link 152.

The one or more actions may comprise at least one of: administering the group of devices 130, configuring the group of devices 130 and monitoring events of the group of devices 130.

In some embodiments, at least one of the following may apply. According to a first option, at least one of the one or more previous indications may indicate the creation of the group of devices 130, e.g., by indicating the ExternalGroup-Id. According to a second option, at least one of the one or more previous indications may indicate the identity of the members of the group of devices 130, e.g., as "UE members: UE-1, UE-2", and the respective actions, of the one or more actions, the one or more other third nodes 113 may be respectively authorized to perform, e.g., as "Group Authorization Data (MTC-provider-2→allowed operations: group membership, event exposure, network configuration), MTC-provider-3→allowed operations: event exposure)".

As a non-limiting example, the one or more previous indications may comprise a single Nnef_ParameterProvision_Create message comprising: "External-Group-Id, DNN, S-NSSAI, UE members: UE-1, UE-2, and Group Authorization Data (MTC-provider-2→allowed operations: group membership, event exposure, network configuration), MTC-provider-3→allowed operations: event exposure)".

Action 402

The second node 112 may check that the fourth node 114 may be allowed to create and manage 5G VN groups. In this Action 402, the second node 112 may determine whether or not the fourth node 114 may be authorized to update authorizations.

Determining may be understood as checking.

That is, as part of this Action 402, the second node 112 may also check that the fourth node 114 may be allowed to provide Group Authorization data to add more permissions than the default permissions for the car maker A as the creator of the group of devices 130.

Action 403

In this Action 403, the second node 112, with the proviso the fourth node 114 may be determined to be authorized, may authorize to update authorizations with the one or more respective authorizations.

Action 404

In this Action 404, the second node 112 sends, based on the received one or more previous indications, the one or more first indications to the first node 111 operating in the communications system 100. As described earlier, the one or more first indications indicate the one or more respective authorizations.

The sending, in this Action 404 may be performed e.g., via the first link 151.

The sending in this Action 404 of the one or more first indications may be performed without intervention of the operator having authorized the one or more respective authorizations.

The one or more first indications may be sent with the proviso the one or more respective authorizations may be authorized.

The sending in this Action 404 may further comprise sending the one or more third indications to the first node 111. The one or more third indications may indicate the one or more authorizations of the fourth node 114 with the group of devices 130.

In some embodiments, at least one of the following may apply. According to a first option, at least one of the one or more previous indications or the one or more first indications may indicate the creation of the group of devices 130. According to a second option, at least one of the one or more previous indications or the one or more first indications may indicate the identity of the members of the group of devices 130, and the respective actions, of the one or more actions, the one or more other third nodes 113 may be respectively authorized to perform.

In some embodiments, at least one of the following may apply. According to a first option, the first node 111 may be a UDM node, the second node 112 may be a NEF, the fourth node 114 may be an AF of an MTC provider, and the one or more third nodes 113 may be one or more other AFs or MTC Providers. According to a second option, each of the one or more first indications may be a Nudm_parameter Provision_Create message or a Nudm_Parameter Provision_Update message. According to a third option, each of the one or more previous indications may be a Nnef_parameterProvision_Create message or a Nnef_parameterProvision_Update message.

As a non-limiting example, the one or more first indications may comprise a single Nudm_ParameterProvision_Create message comprising: "External-Group-Id, DNN, S-NSSAI, UE members: UE-1, UE-2, MTC-Provider-1, NEW: Group Authorization Data (MTC-provider-2→allowed operations: group membership, event exposure, network configuration), MTC-provider-3→allowed operations: event exposure".

Figure 5:
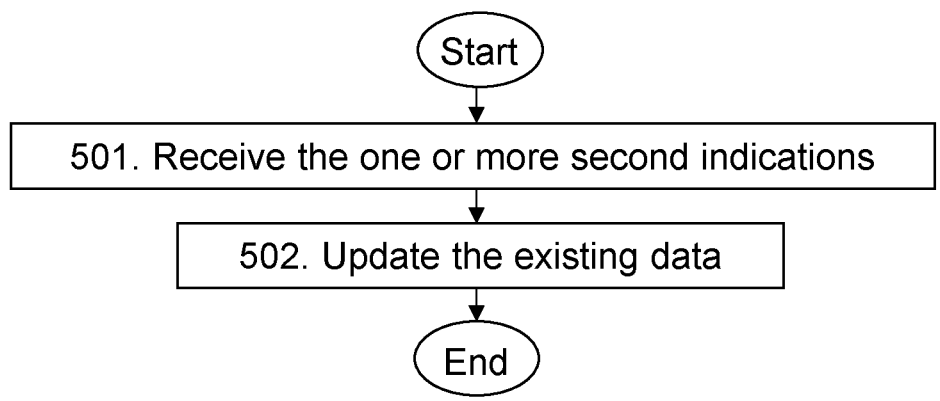
FIG. 5 is a flowchart depicting embodiments of a method in a fifth node, according to embodiments herein.

Embodiments of a computer-implemented method performed by the fifth node 115, will now be described with reference to the flowchart depicted in FIG. 5. The method may be understood to be for handling indications. The fifth node 115 operates in the communications system 100.

The method comprises the following actions. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111 and will thus not be repeated here to simplify the description. For example, the first node 111 may be a UDM node, the fourth node 114 may be an AF of an MTC provider, the one or more third nodes 113 may be one or more other AFs or MTC Providers and the fifth node 115 may be a UDR.

Action 501

In this Action 501, the fifth node 115 receives the one or more second indications from the first node 111 operating in the communications system 100. The one or more second indications indicate the one or more respective authorizations of the one or more third nodes 113 to perform the one or more actions with the group of devices 130. The one or more third nodes 113 may be different than the fourth node 114 operating in the communications system 100. The fourth node 114 has created the group of devices 130.

The receiving, in this Action 501 may be performed, e.g., via the third link 153.

The one or more actions may comprise at least one of: administering the group of devices 130, configuring the group of devices 130 and monitoring events of the group of devices 130.

In some embodiments, at least one of the following may apply. According to a first option, at least one of the one or more second indications may indicate the update to the group of devices 130, e.g., via the Operation: Nudr_Group_Data_update (Pp5gVnGroupprofileData) message, the Operation: Nudr_Group_Data_Update (EeGroupPorfileData) message and/or the Operation: Nudr_Group_Data_Update (PpNetworkConfigurationGroupProfileData) message.

According to a second option, at least one of the one or more second indications may indicate the identity of the members of the group of devices 130, e.g., as "UE members: UE-1, UE-2", According to a third option, each of the one or more second indications may indicate the respective action, of the one or more actions, and the respective one or more other third nodes 113 authorized to perform the respective action, e.g., the Operation: Nudr_Group_Data_update (Pp5gVnGroupprofileData) message may indicate "allowedMTcProviders=MTC-Provider-1, MTC-Provider_2", the Operation: Nudr_Group_Data_Update (EeGroupPorfileData) message may indicate "allowedMTcProviders=MTC-Provider-1, MTC-Provider_2", and the Operation: Nudr_Group_Data_Update (PpNetworkConfigurationGroupProfileData) message may indicate the "MTC-Provider_3, allowedMTcProviders=MTC-Provider-1, MTC-Provider_2".

The one or more respective authorizations may originate from the fourth node 114 operating in the communications system 100, and the one or more second indications may be received with the proviso the one or more respective authorizations may be authorized.

In some embodiments, the receiving in this Action 501 may further comprise receiving the one or more third indications. The one or more third indications may indicate the one or more authorizations of the fourth node 114 with the group of devices 130.

In some embodiments, at least one of the following may apply. According to a first option, the first node 111 may be a UDM node, the fourth node 114 may be an AF of an MTC provider, the one or more third nodes 113 may be one or more other AFs or MTC Providers and the fifth node 115 may be a UDR.

According to a second option, each of the one or more second indications may be a Nudr_Group_Data_Update or a Nudr_DataRepository_Update message.

Action 502

The fifth node 115 updates existing data for the group of devices 130 based on the received one or more second indications. The updating in this Action 502 of the existing data based on the received one or more second indications may comprise to store the one or more respective authorizations.

The updating in this Action 502 of the existing data based on the received one or more second indications may be performed without intervention of the operator having authorized the one or more respective authorizations.

Figure 6:
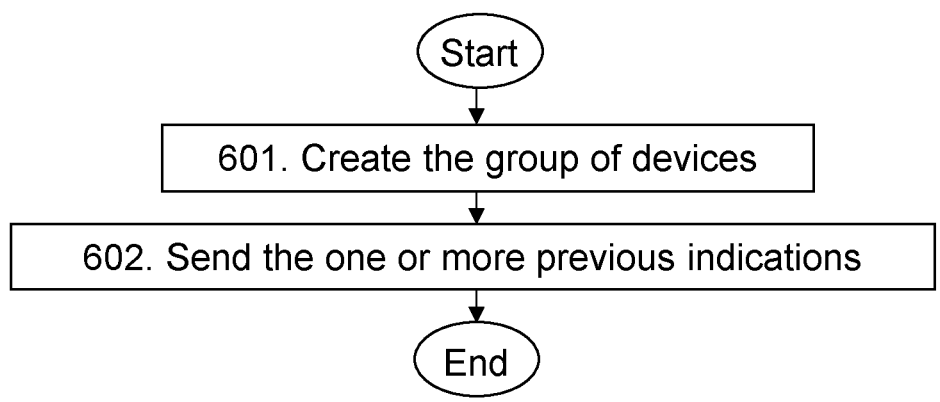
FIG. 6 is a flowchart depicting embodiments of a method in a fourth node, according to embodiments herein.

Embodiments of a computer-implemented method performed by the fourth node 114, will now be described with reference to the flowchart depicted in FIG. 6. The method may be understood to be for handling indications. The fourth node 114 operates in the communications system 100.

The method comprises the following actions. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 6, optional actions are depicted with dashed lines.

The detailed description of some of the following corresponds to the same references provided above, in relation to the actions described for the first node 111 and will thus not be repeated here to simplify the description. For example, the first node 111 may be a UDM node, the fourth node 114 may be an AF of an MTC provider, the one or more third nodes 113 may be one or more other AFs or MTC Providers and the fifth node 115 may be a UDR.

Action 601

In this Action 601, the fourth node 114 creates the group of devices 130.

The fourth node 114 may receive confirmation that the group has been created with the requested authorizations, in the absence of the intervention of the operator having authorized the one or more respective authorizations.

Action 602

In this Action 602, the fourth node 114 sends the one or more previous indications to the second node 112 operating in the communications system 100. The one or more previous indications indicate the one or more respective authorizations of one or more third nodes 113 to perform the one or more actions with the created group of devices 130. The one or more third nodes 113 are different than the fourth node 114.

The sending, in this Action 602 may be performed e.g., via the second link 152.

The sending in this Action 602 of the one or more previous indications may be performed without intervention of the operator having authorized the one or more respective authorizations.

The one or more actions may comprise at least one of: administering the group of devices 130, configuring the group of devices 130 and monitoring events of the group of devices 130.

In some embodiments, the sending in this Action 602 may further comprise sending the one or more third indications. The one or more third indications may indicate the one or more authorizations of the fourth node 114 with the group of devices 130.

It may be understood that the one or more third indications from the fourth node 114 to the second node 112 may be one or more messages of a different type than the one or more third indications from the second node 112 to the first node 111 and/or than the one or more third indications from the first node 111 to the fifth node 115. Similarly, the one or more third indications from the second node 112 to the first node 111 may be one or more messages of a different type than the one or more third indications from the first node 111 to the fifth node 115.

In some embodiments, at least one of the following may apply. According to a first option, at least one of the one or more previous indications may indicate the creation of the group of devices 130, e.g., via the External-Group-Id.

According to a second option, at least one of the one or more previous indications may indicate the identity of the members of the group of devices 130, e.g., as "UE members: UE-1, UE-2".

According to a third option, at least one of the one or more previous indications may indicate the respective action, of the respective actions, and respective one or more other third nodes 113 authorized to perform the respective action, e.g., as "Group Authorization Data (MTC-provider-2→allowed operations: group membership, event exposure, network configuration), MTC-provider-3→allowed operations: event exposure)".

In some embodiments, at least one of the following may apply. According to a first option, the fourth node 114 may be an AF of an MTC provider, the second node 112 may be a NEF, and the one or more third nodes 113 may be one or more other AFs or MTC Providers.

According to a second option, each of the one or more previous indications may be Nnef_parameterProvision_Create message or a Nnef_parameterProvision_Update message.

A non-limiting examples of a method in the communications system 100 according to embodiments herein will now be described in the next Figure.

Figure 7:
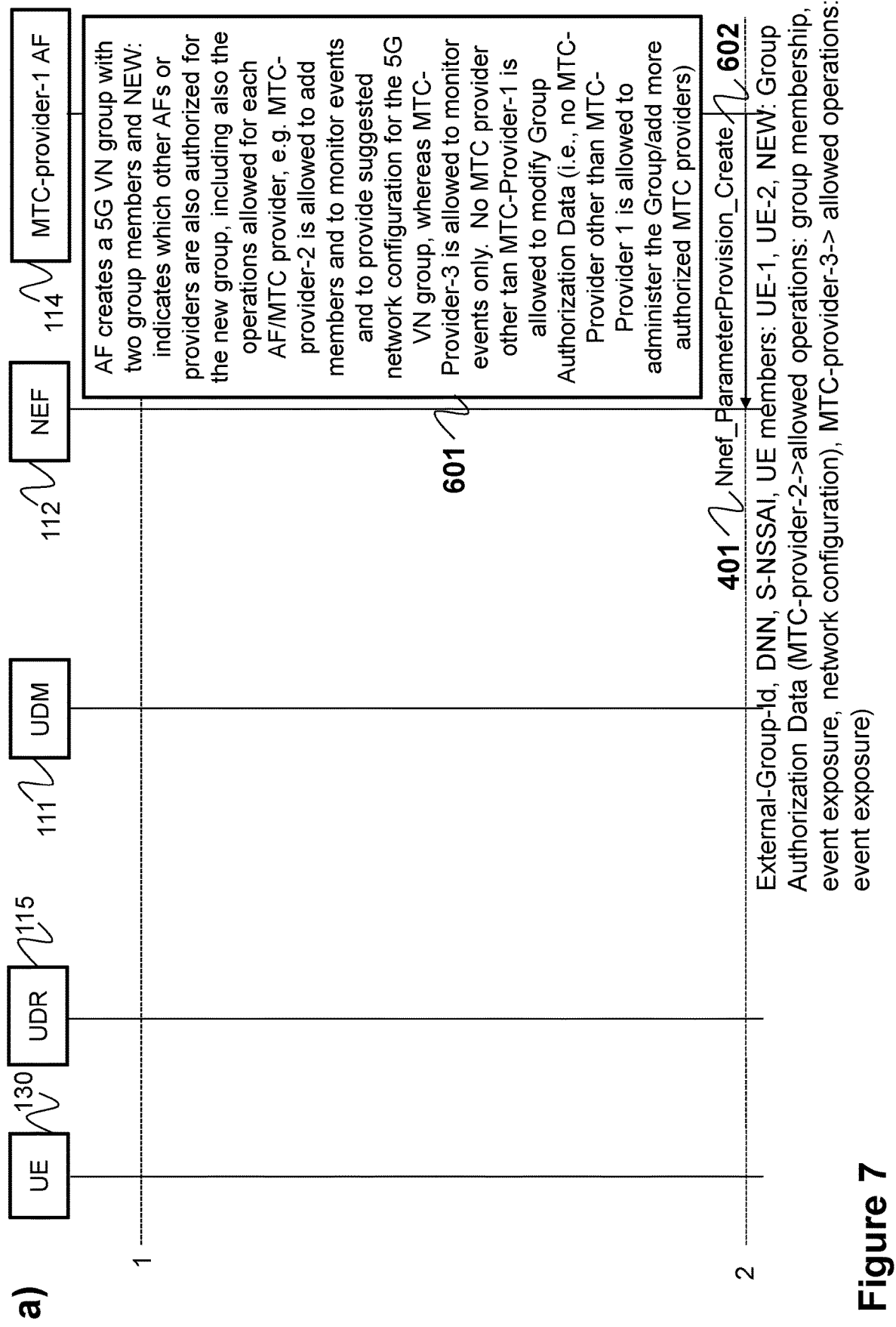
FIG. 7 is a schematic diagram depicting a non-limiting example of signalling between nodes in a communications system, according to embodiments herein.
Figure 7:
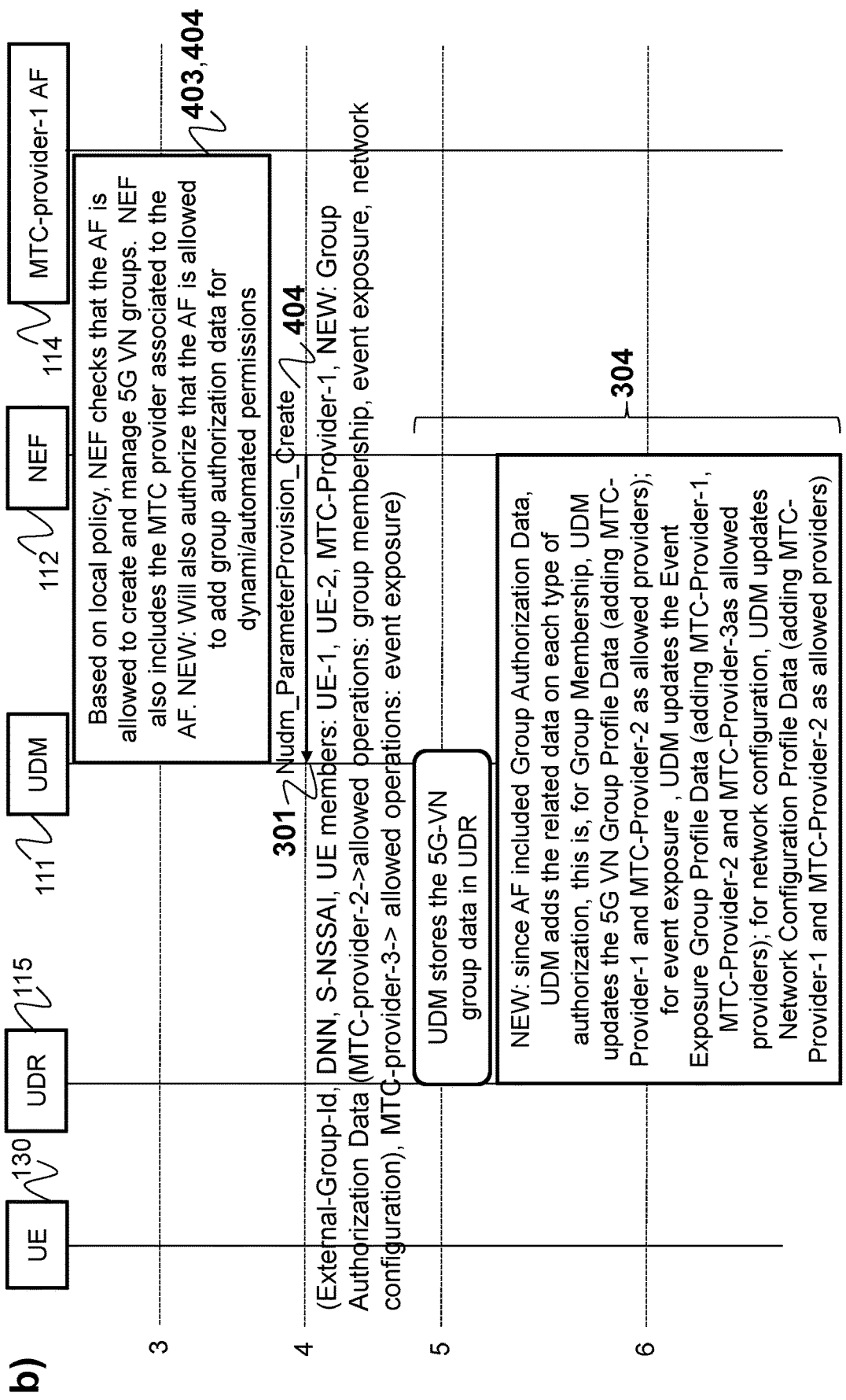
Figure 7:
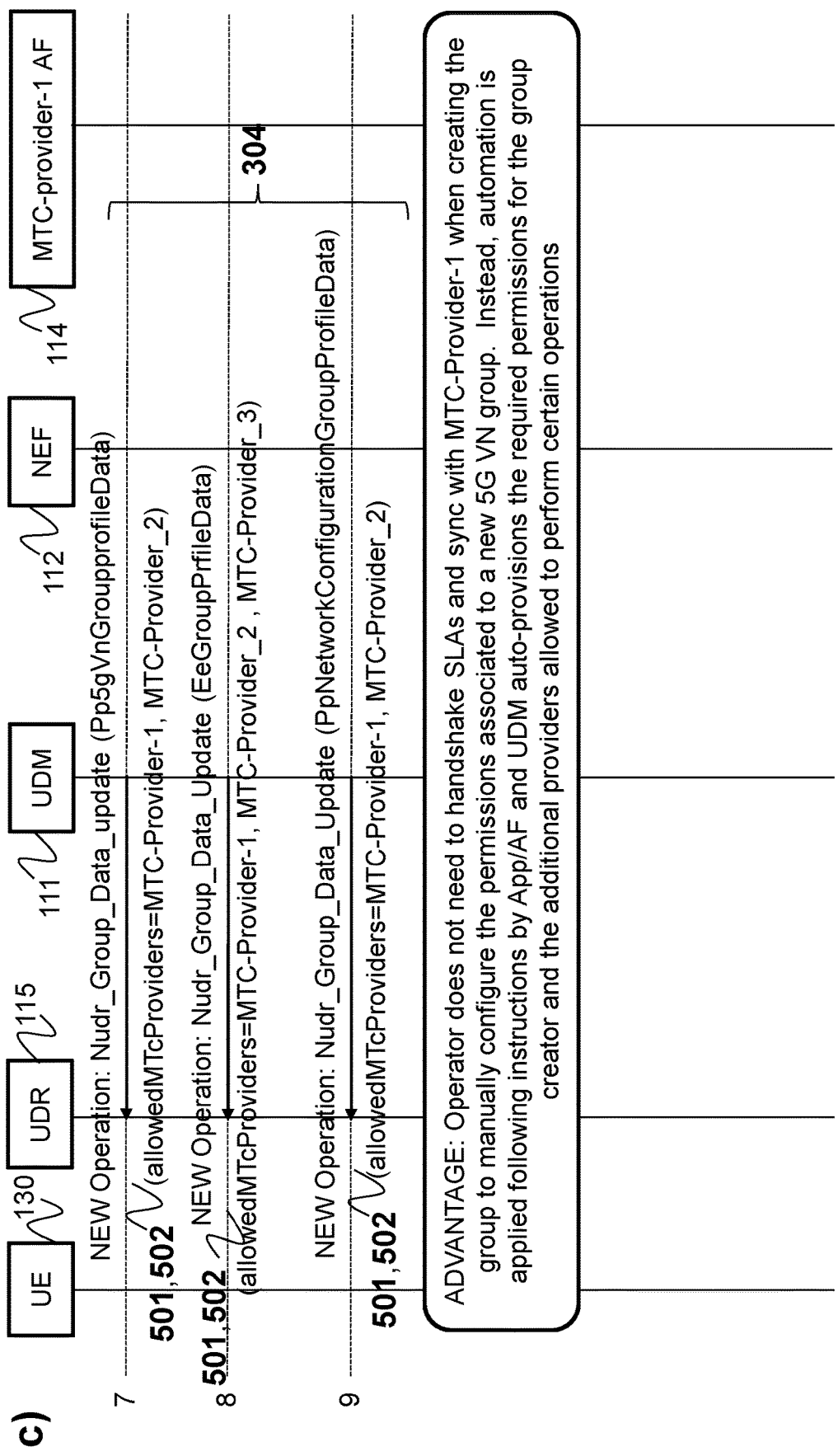

FIG. 7 is a signalling diagram depicting a non-limiting example of a method performed in the communications system 100, according to embodiments herein, over panels a), b) and c). Panel b) is a continuation of panel a) and panel c) is a continuation of panel b). In FIG. 7, the first node 111 is a UDM, the second node 112 is a NEF, the fourth node 114 is an AF of an MTC-provider-1, fifth node 115 is a UDR and the group of devices 130 is represented by a UE. In Step 1, the fourth node 114, an AF belonging to an MTC provider, e.g., car maker A, may, in accordance with Action 601, create a group of devices 130, e.g., a group of self-driving cars as a car fleet, in the communications system 100. The fourth node 114 may, for example, add two group members, e.g., two UEs embedded in each of the cars in the car fleet, as part of the group of devices 130. As part of the group data, the fourth node 114 may include new information, which may be referred to herein as group authorization data, which may indicate the one or more third nodes 113. That is, other AFs or additional MTC Providers, e.g., MTC provider 2→a search engine provider, and MTC Provider 3→movie provider not illustrated in FIG. 7, with certain permissions to manage the group of devices 130, including also the operations allowed for each AF/MTC provider. In the same group creation request, in Step 2, the fourth node 114, in accordance with Action 602, additionally adds the group authorization data information, which includes permissions per MTC provider and per service operation by sending the one or more previous indications to the second node 112. The request from the fourth node 114 may be understood to intend to provide other providers, in addition to MTC provider 1→car maker A with some permissions for operations targeting the group of devices 130. Hence, car maker A, as the group creator, may be understood to have all permissions, whereas the search engine provider and the movie provider may be provided with the one or more respective authorizations to perform the one or more actions with the group of devices 130. That is, certain permissions for the devices in the group of devices 130. MTC-provider-2 is allowed to add members and to monitor events and to provide suggested network configuration for the 5G VN group, whereas MTC-Provider-3 is allowed to monitor events only. No MTC provider other than MTC-Provider-1 is allowed to modify Group Authorization Data. That is, no MTC-Provider other than MTC-Provider 1 is allowed to administer the Group/add more authorized MTC providers. The fourth node 114 sends the one or more previous indications in a single Nnef_ParameterProvision_Create message comprising: "External-Group-Id, DNN, S-NSSAI, UE members: UE-1, UE-2, and Group Authorization Data (MTC-provider-2→allowed operations: group membership, event exposure, network configuration), MTC-provider-3→allowed operations: event exposure), which the second node 112 receives in accordance with Action 401. In Step 3, based on local policy, the second node 112 checks, in accordance with Action 402, that the fourth node 114, that is, the AF, is allowed to create and manage 5G VN groups and authorizes the request from the fourth node 114, that is, if AF/car maker A is allowed to create groups. The second node 112 also includes the MTC provider associated to the AF. Additionally, in accordance with Action 403, the second node 112 also checks that the fourth node 114 is allowed to provide Group Authorization data to add more permissions than the default permissions for car maker A as the group creator, and in this example, authorizes that the fourth node 114 is allowed to add group authorization data for dynamic/automated permissions. If allowed, the request is sent in Step 4 to the first node 111 in accordance with Action 404 in a Nudm_ParameterProvision_Create message. The second node 112 includes the MTC provider for car maker A, based on the AF ID, and towards the first node 111, and forwards the Group Authorization data. The Nudm_ParameterProvision_Create message includes External-Group-Id, DNN, S-NSSAI, UE members: UE-1, UE-2, MTC-Provider-1, NEW: Group Authorization Data (MTC-provider-2→allowed operations: group membership, event exposure, network configuration), MTC-provider-3→allowed operations: event exposure. In step 5, the first node 111, in accordance with Action 304, stores the group information in the fifth node 115. The data stored may exclude the Group Authorization data from being stored as part of the Group Data as such, since the one or more authorizations, and/or the one or more respective authorizations, may be understood to not be part of the Group Data as such, which may comprise DNN, NSSAI, and UE group members, but part of the authorized MTC providers for the group of devices 130. In Step 6, since the fourth node 114 included Group Authorization Data, the first node 111 adds the related data on each type of authorization. That is, the first node 111 builds the list of Providers authorized for each related data: 5G VN group data to add/remove UE members, event exposure data to monitor events, parameter provisioning to set network configuration, according to the information included by the fourth node 114 in step 1-2. This is, for Group Membership, the first node 111 updates the 5G VN Group Profile Data, adding MTC-Provider-1 and MTC-Provider-2 as allowed providers; for event exposure, the first node 111 updates the Event Exposure Group Profile Data, adding MTC-Provider-1, MTC-Provider-2 and MTC-Provider-3 as allowed providers; for network configuration, the first node 111 updates Network Configuration Profile Data, adding MTC-Provider-1 and MTC-Provider-2 as allowed providers. Hence, the first node 111 will firstly add in Step 7, in accordance with Action 304, by using a new service operation defined herein, in a Nudr_Group_Data_Update, MTC-Provider-1 and MTC-Provider_2 as allowed to manage 5G VN group data (Pp5gVnGroupProfileData), that is, allowed to add/remove UE members for the group of devices 130. The first node 111 will secondly add in Step 8, in accordance with Action 304, by using the same new service operation Nudr_Group_Data_Update to EeGroupProfileData, MTC-Provider-1, MTC-Provider_2, and MTC-Provider_3 as allowed MTC providers for event exposure, EeGroupProfileData. Lastly, the first node 111 will add in Step 9, in accordance with Action 304, using again, the same new service operation Nudr_Group_Data_Update to PpNetworkConfigurationGroupProfileData, MTC-Provider-1, and MTC-Provider_2 as allowed for network configuration. The fifth node 115 receives the one or more second indications in each of Step 7, 8 and 9 according to Action 501 and updates the existing data in accordance with Action 502. The result may be understood to be that the fourth node 114 has created a group of devices 130 with the proper permissions from the very moment of the group creation and in an automated manner. As an advantage, the operator does not need to handshake SLAs and synchronize with MTC-Provider-1 when creating the group of devices 130 to manually configure the permissions associated to a new 5G VN group. Instead, automation may be applied following instructions by App/AF and the first node 111 may auto-provision the required permissions for the group creator and the additional providers allowed to perform certain operations.

Figure 8:
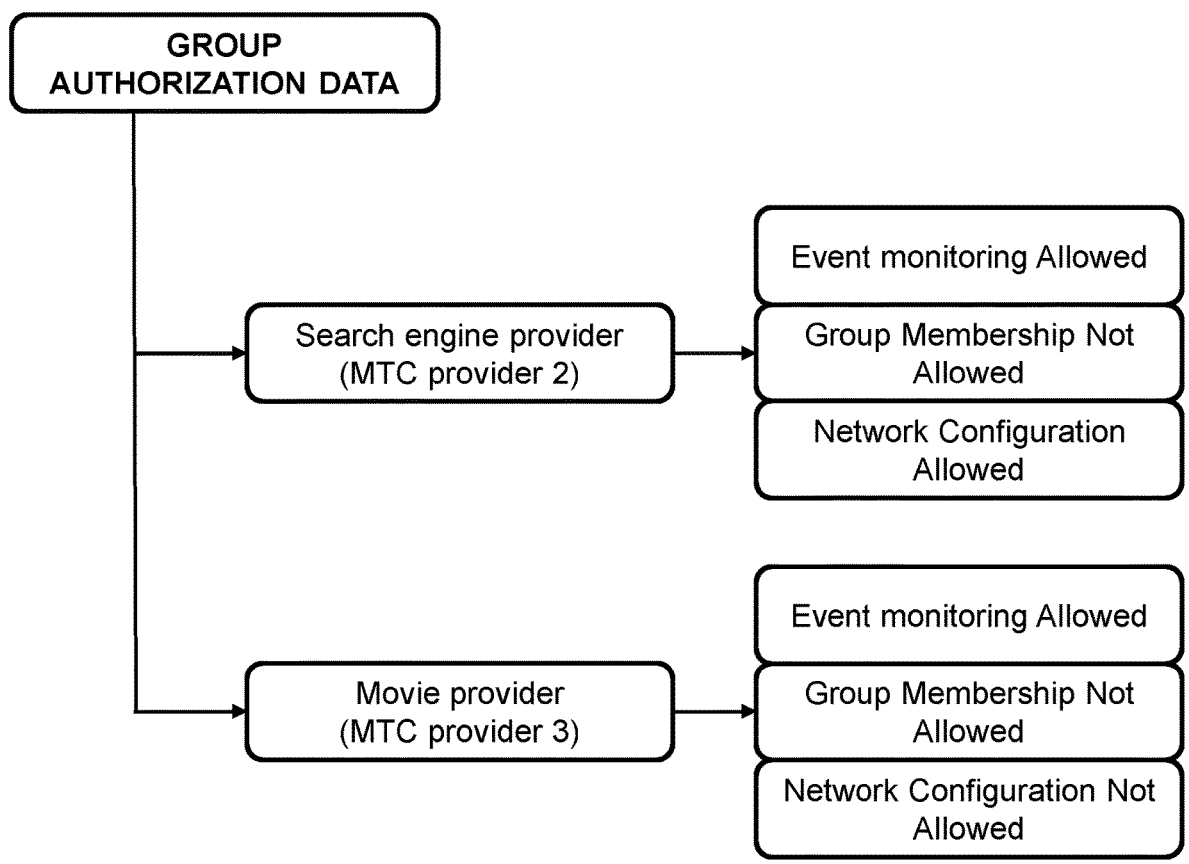
FIG. 8 is a schematic diagram depicting aspects of a method performed in a communications system, according to embodiments herein.

FIG. 8 is a schematic diagram depicting a non-limiting example of the one or more respective authorizations of the one or more third nodes 113 to perform the respective actions, of the one or more actions, with the group of devices 130 as Group Authorization Data. In this example, e.g., MTC-provider-2, a search engine provider, is allowed to perform event monitoring and network configuration, but is not allowed to alter the group membership. MTC-provider-3, a movie provider, is allowed to perform event monitoring, but is not allowed to alter the group membership nor to perform network configuration.

Certain embodiments disclosed herein may provide one or more of the following technical advantage(s), which may be summarized as follows.

As a first advantage, embodiments herein may be understood to enable a complete automation of a 5G VN group, including permissions and/or authorization of 5G VN groups, without the need of any administrative task taken by the operator.

As an additional advantage, embodiments herein may enable to fill the gap or security hole in dynamic group creation, since from the moment the group may be created to the moment the operator may provision the permissions for the group, any AF may hijack and/or manipulate the group or even delete the group.

Figure 9:
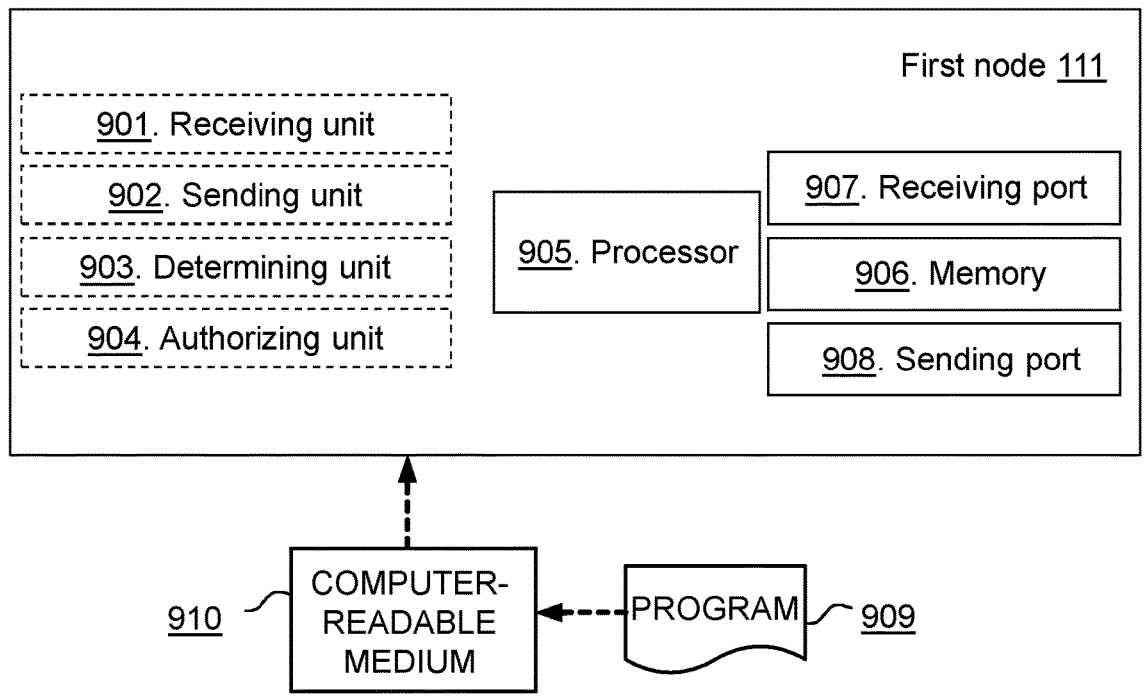
FIG. 9 is a schematic block diagram illustrating two non-limiting examples, a) and b), of a first node, according to embodiments herein.
Figure 9:
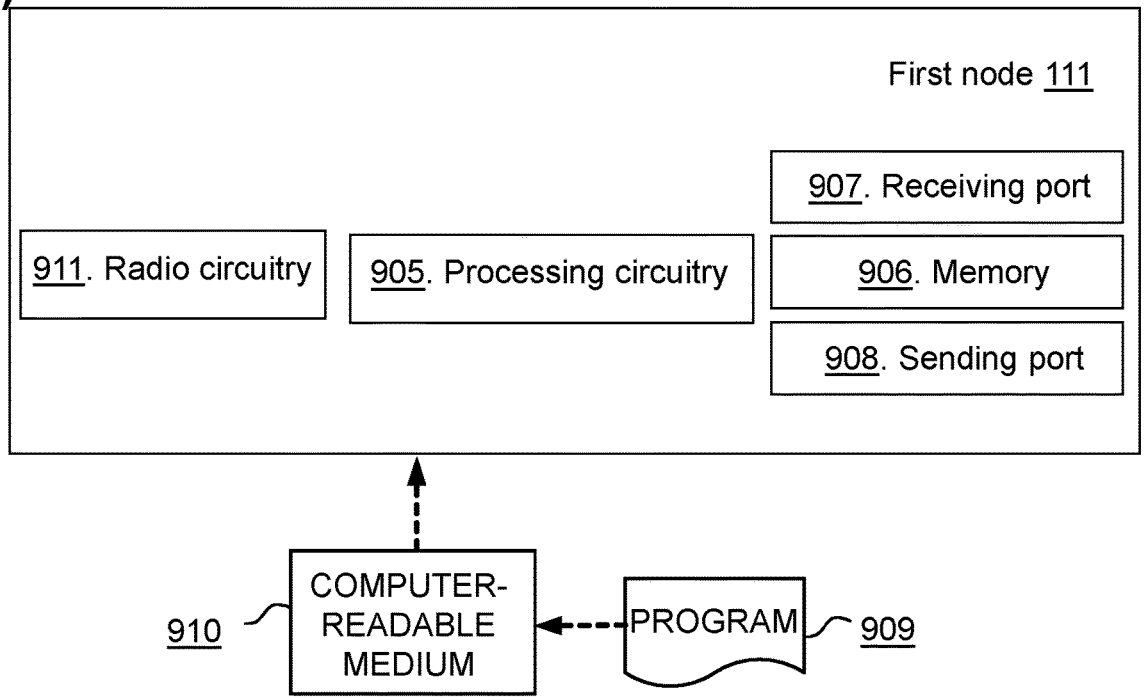

FIG. 9 depicts two different examples in panels a) and b), respectively, of the arrangement that the first node 111 may comprise to perform the method actions described above in relation to FIG. 3 and/or FIG. 7. In some embodiments, the first node 111 may comprise the following arrangement depicted in FIG. 9a. The first node 111 may be understood to be for handling indications. The first node 111 is configured to operate in the communications system 100.

Several embodiments are comprised herein. Components from one embodiment may be tacitly assumed to be present in another embodiment and it will be obvious to a person skilled in the art how those components may be used in the other exemplary embodiments. In FIG. 9, optional boxes are indicated by dashed lines. The detailed description of some of the following corresponds to the same references provided above, in relation to the actions described for the first node 111 and will thus not be repeated here. For example, the first node 111 may be configured to be a UDM node, the second node 112 may be configured to be a NEF, the fourth node 114 may be configured to be an AF, or an MTC provider, the one or more third nodes 113 may be configured to be one or more other AFs or MTC providers, and the fifth node 115 may be configured to be a UDR.

The first node 111 is configured to, e.g., by means of a receiving unit 901 within the first node 111 configured to, receive, the one or more first indications from the second node 112 configured to operate in the communications system 100. The one or more first indications are configured to indicate the one or more respective authorizations of the one or more third nodes 113 to perform the one or more actions with the group of devices 130. The one or more third nodes 113 are configured to be different than the fourth node 114 configured to operate in the communications system 100. The fourth node 114 is configured to have created the group of devices 130.

The first node 111 is also configured to, e.g., by means of a sending unit 902 within the first node 111 configured to, send, based on the received one or more first indications, the one or more second indications to the fifth node 115 configured to operate in the communications system 100. The one or more second indications are configured to indicate to store the one or more respective authorizations.

In some embodiments, the sending of the one or more second indications may be configured to be performed without intervention of the operator having authorized the one or more respective authorizations.

In some embodiments, the sending may be further configured to comprise sending one or more third indications to the fifth node 115. The one or more third indications may be configured to indicate the one or more authorizations of the fourth node 114 with the group of devices 130.

The one or more actions may be configured to comprise at least one of: administering the group of devices 130, configuring the group of devices 130 and monitoring events of the group of devices 130.

In some embodiments, one of the following options may apply. According to a first option, at least one of the one or more first indications or the second indications may be configured to indicate the creation of the group of devices 130. According to a second option, at least one of the one or more first indications or the one or more second indications may be configured to indicate the identity of the members of the group of devices 130. According to a third option, at least one of the one or more first indications may be configured to indicate the respective actions, of the one or more actions, the one or more third nodes 113 may be respectively configured to be authorized to perform. According to a fourth option, each of the one or more second indications may be configured to indicate the respective action of the respective actions, and the respective one or more third nodes 113 configured to be authorized to perform the respective action.

In some embodiments, at least one of the following options may apply. According to a first option, the first node 111 may be configured to be a UDM node, the second node 112 may be configured to be a NEF, the fourth node 114 may be configured to be an AF, or an MTC provider, the one or more third nodes 113 may be configured to be one or more other AFs or MTC providers, and the fifth node 115 may be configured to be a UDR. According to a second option, each of the one or more first indications may be configured to be a Nudm_parameterProvision_Create message or a Nudm_ParameterProvision_Update message. According to a third option, each of the one or more second indications may be configured to be a Nudr_Group_Data_Update or a Nudr_DataRepository_Update message.

In some embodiments, wherein the one or more respective authorizations may be configured to originate from the fourth node 114 operating in the communications system 100, the first node 111 may be also configured to, e.g., by means of a determining unit 903 within the first node 111 configured to, determine whether or not the fourth node 114 may be authorized to update the authorizations for the group of devices 130.

In some embodiments, wherein the one or more respective authorizations may be configured to originate from the fourth node 114 operating in the communications system 100, the first node 111 may be also configured to, e.g., by means of an authorizing unit 904 within the first node 111 configured to, with the proviso the fourth node 114 is determined to be authorized, authorize to update authorizations for the group of devices 130 with the one or more respective authorizations. The one or more second indications may be configured to be sent with the proviso the one or more respective authorizations may be authorized.

In some embodiments, to store the one or more respective authorizations may be configured to comprise to update existing data for the group of devices 130 at the fifth node 115.

The embodiments herein may be implemented through one or more processors, such as a processor 905 in the first node 111 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 906 comprising one or more memory units. The memory 906 is arranged to be used to store obtained information, store data, configurations, schedulings, and applications etc. to perform the methods herein when being executed in the first node 111.

In some embodiments, the first node 111 may receive information from, e.g., the second node 112, the one or more third nodes 113, the fourth node 114, the fifth node 115, the group of devices 130 and/or another node through a receiving port 907. In some examples, the receiving port 907 may be, for example, connected to one or more antennas in the first node 111. In other embodiments, the first node 111 may receive information from another structure in the communications system 100 through the receiving port 907. Since the receiving port 907 may be in communication with the processor 905, the receiving port 907 may then send the received information to the processor 905. The receiving port 907 may also be configured to receive other information.

The processor 905 in the first node 111 may be further configured to transmit or send information to e.g., the second node 112, the one or more third nodes 113, the fourth node 114, the fifth node 115, the group of devices 130, another node and/or another structure in the communications system 100, through a sending port 908, which may be in communication with the processor 905, and the memory 906.

Those skilled in the art will also appreciate that any of the units 901-904 described above may refer to a combination of analog and digital circuits, and/or one or more processors configured with software and/or firmware, e.g., stored in memory, that, when executed by the one or more processors such as the processor 905, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 901-904 described above may be the processor 905 of the first node 111, or an application running on such processor.

Thus, the methods according to the embodiments described herein for the first node 111 may be respectively implemented by means of a computer program 909 product, comprising instructions, i.e., software code portions, which, when executed on at least one processor 905, cause the at least one processor 905 to carry out the actions described herein, as performed by the first node 111. The computer program 909 product may be stored on a computer-readable storage medium 910. The computer-readable storage medium 910, having stored thereon the computer program 909, may comprise instructions which, when executed on at least one processor 905, cause the at least one processor 905 to carry out the actions described herein, as performed by the first node 111. In some embodiments, the computer-readable storage medium 910 may be a non-transitory computer-readable storage medium, such as a CD ROM disc, a memory stick, or stored in the cloud space. In other embodiments, the computer program 909 product may be stored on a carrier containing the computer program, wherein the carrier is one of an electronic signal, optical signal, radio signal, or the computer-readable storage medium 910, as described above.

The first node 111 may comprise an interface unit to facilitate communications between the first node 111 and other nodes or devices, e.g., the second node 112, the one or more third nodes 113, the fourth node 114, the fifth node 115, the group of devices 130, another node and/or another structure in the communications system 100. In some particular examples, the interface may, for example, include a transceiver configured to transmit and receive radio signals over an air interface in accordance with a suitable standard.

In other embodiments, the first node 111 may comprise the following arrangement depicted in FIG. 9b. The first node 111 may comprise a processing circuitry 905, e.g., one or more processors such as the processor 905, in the first node 111 and the memory 906. The first node 111 may also comprise a radio circuitry 911, which may comprise e.g., the receiving port 907 and the sending port 908. The processing circuitry 905 may be configured to, or operable to, perform the method actions according to FIG. 3 and/or FIG. 7, in a similar manner as that described in relation to FIG. 9a. The radio circuitry 911 may be configured to set up and maintain at least a wireless connection with the second node 112, the one or more third nodes 113, the fourth node 114, the fifth node 115, the group of devices 130, another node and/or another structure in the communications system 100.

Hence, embodiments herein also relate to the first node 111 operative for handling indications, the first node 111 being operative to operate in the communications system 100. The first node 111 may comprise the processing circuitry 905 and the memory 906, said memory 906 containing instructions executable by said processing circuitry 905, whereby the first node 111 is further operative to perform the actions described herein in relation to the first node 111, e.g., in FIG. 3 and/or FIG. 7.

Figure 10:
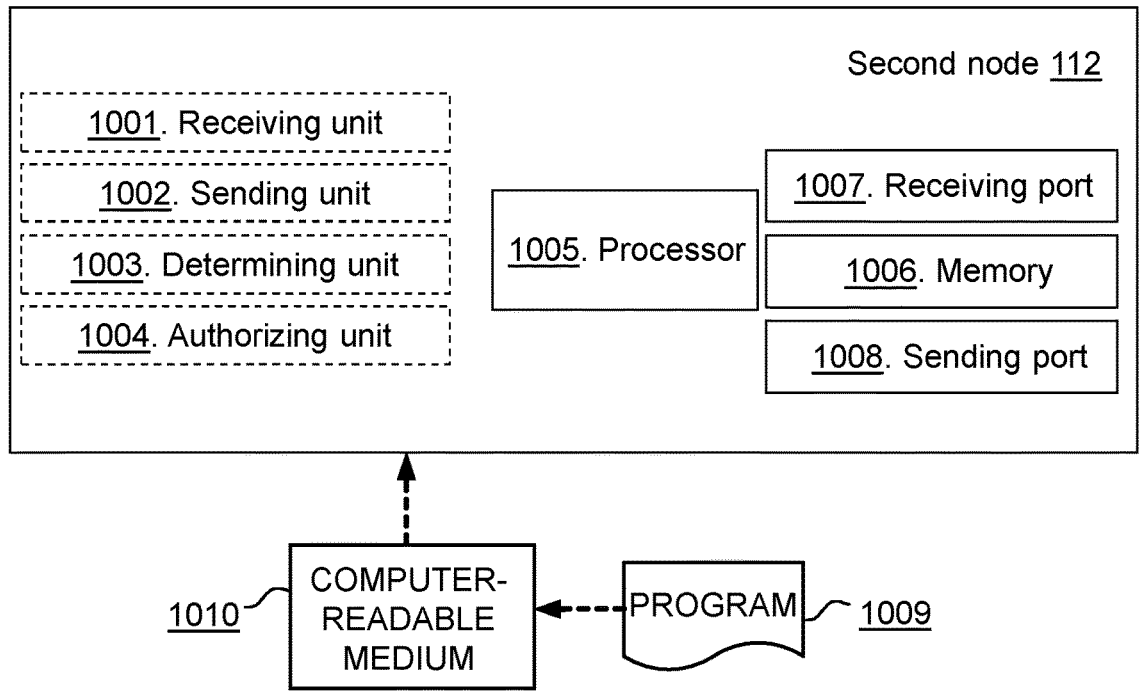
FIG. 10 is a schematic block diagram illustrating two non-limiting examples, a) and b), of a second node, according to embodiments herein.
Figure 10:
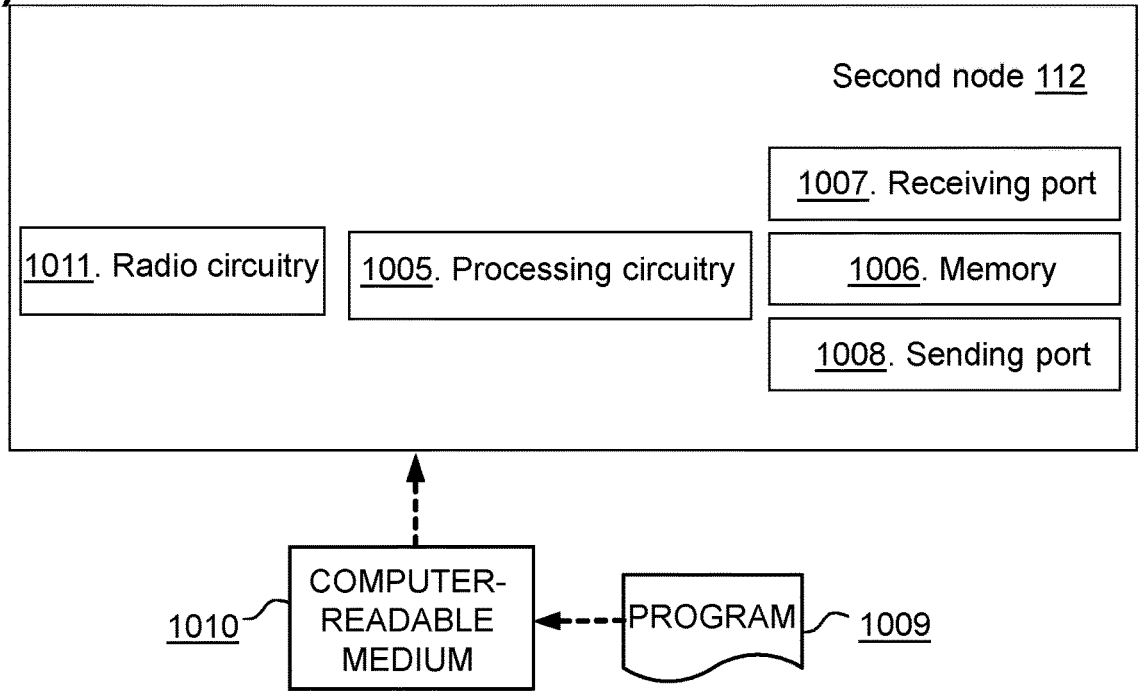

FIG. 10 depicts two different examples in panels a) and b), respectively, of the arrangement that the second node 112, may comprise to perform the method actions described above in relation to FIG. 4 and/or FIG. 7. In some embodiments, the second node 112 may comprise the following arrangement depicted in FIG. 10a. The second node 112 may be understood to be for handling indications. The second node 112 is configured to operate in the communications system 100.

Several embodiments are comprised herein. Components from one embodiment may be tacitly assumed to be present in another embodiment and it will be obvious to a person skilled in the art how those components may be used in the other exemplary embodiments. In FIG. 10, optional boxes are indicated by dashed lines. The detailed description of some of the following corresponds to the same references provided above, in relation to the actions described for the second node 112 and will thus not be repeated here. For example, the first node 111 may be configured to be a UDM node, the second node 112 may be configured to be a NEF, the fourth node 114 may be configured to be an AF, or an MTC provider, and the one or more third nodes 113 may be configured to be one or more other AFs or MTC providers.

The second node 112 is configured to, e.g., by means of a receiving unit 1001 within the second node 112 configured to, receive, the one or more previous indications from the fourth node 114 configured to operate in the communications system 100. The one or more previous indications are configured to indicate the one or more respective authorizations of the one or more third nodes 113 to perform the one or more actions with the group of devices 130. The one or more third nodes 113 are configured to be different than the fourth node 114 having created the group of devices 130.

The second node 112 is also configured to, e.g., by means of a sending unit 1002 within the second node 112 configured to, send, based on the one or more previous indications configured to be received, the one or more first indications to the first node 111 configured to operate in the communications system 100. The one or more first indications are configured to indicate the one or more respective authorizations.

In some embodiments, the sending of the one or more first indications may be configured to be performed without intervention of the operator having authorized the one or more respective authorizations.

In some embodiments, the sending may be further configured to comprise sending the one or more third indications to the first node 111. The one or more third indications may be configured to indicate the one or more authorizations of the fourth node 114 with the group of devices 130.

In some embodiments, the one or more actions may be configured to comprise at least one of: administering the group of devices 130, configuring the group of devices 130 and monitoring events of the group of devices 130.

In some embodiments, at least one of the following may apply. According to a first option, at least one of the one or more previous indications or the one or more first indications may be configured to indicate the creation of the group of devices 130. According to a second option, at least one of the one or more previous indications or the one or more first indications may be configured to indicate the identity of the members of the group of devices 130, and the respective actions, of the one or more actions, the one or more third nodes 113 may be respectively configured to be authorized to perform.

In some embodiments, at least one of the following options may apply. According to a first option, the first node 111 may be configured to be a UDM node, the second node 112 may be configured to be a NEF, the fourth node 114 may be configured to be an AF, or an MTC provider, and the one or more third nodes 113 may be configured to be one or more other AFs or MTC providers. According to a second option, each of the one or more first indications may be configured to be a Nudm_parameterProvision_Create message or a Nudm_ParameterProvision_Update message. According to a third option, each of the one or more previous indications may be configured to be a Nnef_parameterProvision_Create or a Nnef_parameterProvision_Update message.

In some embodiments, the second node 112 may be further configured to, e.g., by means of a determining unit 1003 within the second node 112 configured to, determine whether or not the fourth node 114 may be authorized to update authorizations.

In some embodiments, the second node 112 may be configured to, e.g., by means of an authorizing unit 1004 within the second node 112 configured to, with the proviso the fourth node 114 may be determined to be authorized, authorize to update authorizations with the one or more respective authorizations. The one or more first indications may be configured to be sent with the proviso the one or more respective authorizations may be authorized.

The embodiments herein may be implemented through one or more processors, such as a processor 1005 in the second node 112 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1006 comprising one or more memory units. The memory 1006 is arranged to be used to store obtained information, store data, configurations, schedulings, and applications etc. to perform the methods herein when being executed in the second node 112.

In some embodiments, the second node 112 may receive information from, e.g., the first node 111, the second node 112, the one or more third nodes 113, the fourth node 114, the fifth node 115, the group of devices 130, and/or another node, through a receiving port 1007. In some examples, the receiving port 1007 may be, for example, connected to one or more antennas in the second node 112. In other embodiments, the second node 112 may receive information from another structure in the communications system 100 through the receiving port 1007. Since the receiving port 1007 may be in communication with the processor 1005, the receiving port 1007 may then send the received information to the processor 1005. The receiving port 1007 may also be configured to receive other information.

The processor 1005 in the second node 112 may be further configured to transmit or send information to e.g., the first node 111, the second node 112, the one or more third nodes 113, the fourth node 114, the fifth node 115, the group of devices 130, another node and/or another structure in the communications system 100, through a sending port 1008, which may be in communication with the processor 1005, and the memory 1006.

Those skilled in the art will also appreciate that any of the units 1001-1004 described above may refer to a combination of analog and digital circuits, and/or one or more processors configured with software and/or firmware, e.g., stored in memory, that, when executed by the one or more processors such as the processor 1005, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 1001-1004 described above may be the processor 1005 of the second node 112, or an application running on such processor.

Thus, the methods according to the embodiments described herein for the second node 112 may be respectively implemented by means of a computer program 1009 product, comprising instructions, i.e., software code portions, which, when executed on at least one processor 1005, cause the at least one processor 1005 to carry out the actions described herein, as performed by the second node 112. The computer program 1009 product may be stored on a computer-readable storage medium 1010. The computer-readable storage medium 1010, having stored thereon the computer program 1009, may comprise instructions which, when executed on at least one processor 1005, cause the at least one processor 1005 to carry out the actions described herein, as performed by the second node 112. In some embodiments, the computer-readable storage medium 1010 may be a non-transitory computer-readable storage medium, such as a CD ROM disc, a memory stick, or stored in the cloud space. In other embodiments, the computer program 1009 product may be stored on a carrier containing the computer program, wherein the carrier is one of an electronic signal, optical signal, radio signal, or the computer-readable storage medium 1010, as described above.

The second node 112 may comprise an interface unit to facilitate communications between the second node 112 and other nodes or devices, e.g., the first node 111, the second node 112, the one or more third nodes 113, the fourth node 114, the fifth node 115, the group of devices 130, another node and/or another structure in the communications system 100. In some particular examples, the interface may, for example, include a transceiver configured to transmit and receive radio signals over an air interface in accordance with a suitable standard.

In other embodiments, the second node 112 may comprise the following arrangement depicted in FIG. 10b. The second node 112 may comprise a processing circuitry 1005, e.g., one or more processors such as the processor 1005 in the second node 112 and the memory 1006. The second node 112 may also comprise a radio circuitry 1011, which may comprise e.g., the receiving port 1007 and the sending port 1008. The processing circuitry 1005 may be configured to, or operable to, perform the method actions according to FIG. 4 and/or FIG. 7, in a similar manner as that described in relation to FIG. 10a. The radio circuitry 1011 may be configured to set up and maintain at least a wireless connection with the first node 111, the second node 112, the one or more third nodes 113, the fourth node 114, the fifth node 115, the group of devices 130, another node and/or another structure in the communications system 100.

Hence, embodiments herein also relate to the second node 112 operative for handling indications, the second node 112 being operative to operate in the communications system 100. The second node 112 may comprise the processing circuitry 1005 and the memory 1006, said memory 1006 containing instructions executable by said processing circuitry 1005, whereby the second node 112 is further operative to perform the actions described herein in relation to the second node 112, e.g., in FIG. 4 and/or FIG. 7.

Figure 11:
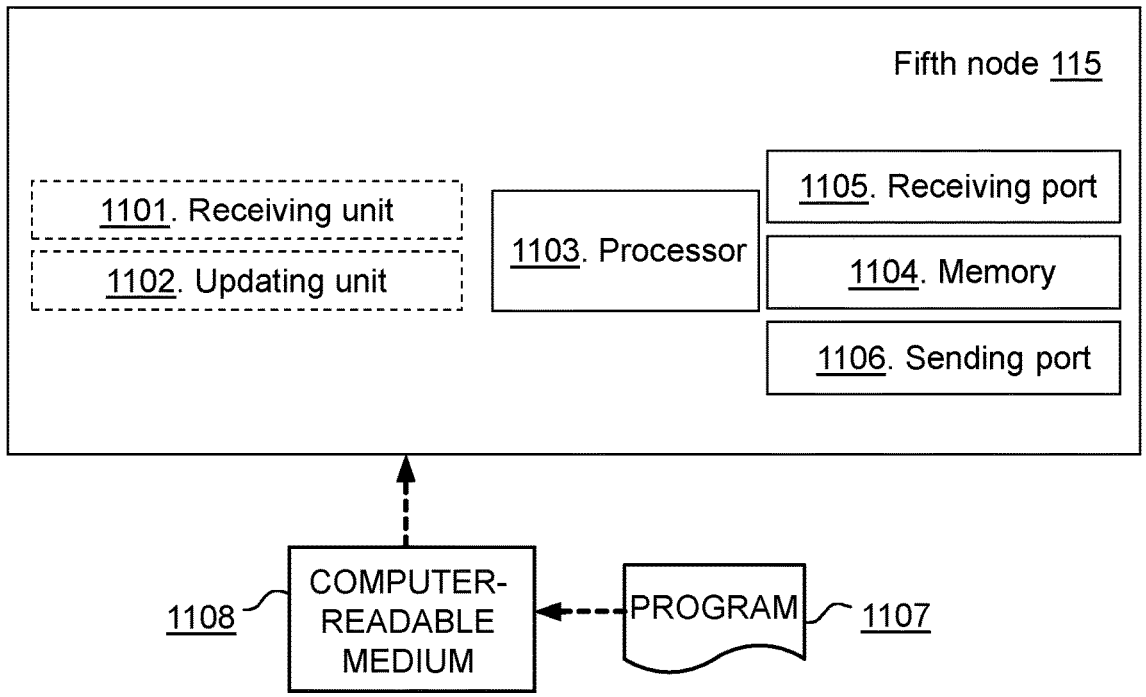
FIG. 11 is a schematic block diagram illustrating two non-limiting examples, a) and b), of a fifth node, according to embodiments herein.
Figure 11:
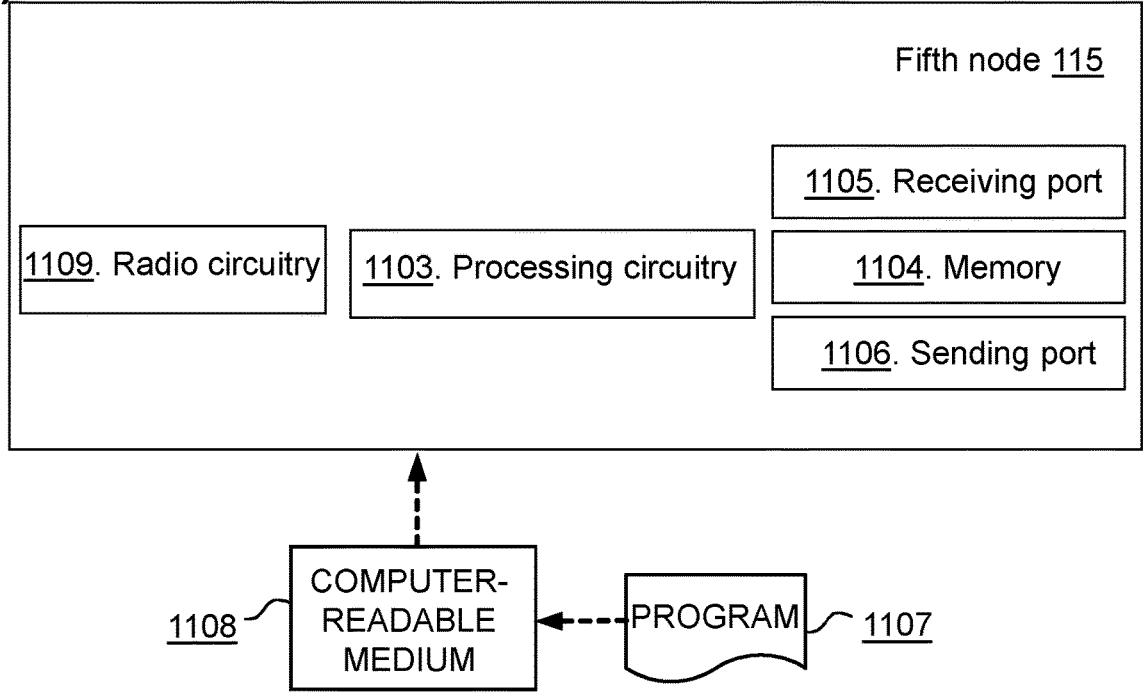

FIG. 11 depicts two different examples in panels a) and b), respectively, of the arrangement that the fifth node 115 may comprise to perform the method actions described above in relation to FIG. 5 and/or FIG. 7. In some embodiments, the fifth node 115 may comprise the following arrangement depicted in FIG. 11a. The fifth node 115 may be understood to be for handling indications. The fifth node 115 is configured to operate in the communications system 100.

Several embodiments are comprised herein. Components from one embodiment may be tacitly assumed to be present in another embodiment and it will be obvious to a person skilled in the art how those components may be used in the other exemplary embodiments. In FIG. 11, optional boxes are indicated by dashed lines. The detailed description of some of the following corresponds to the same references provided above, in relation to the actions described for the fifth node 115 and will thus not be repeated here. For example, the first node 111 may be configured to be a UDM node, the second node 112 may be configured to be a NEF, the fourth node 114 may be configured to be an AF, or an MTC provider, the one or more third nodes 113 may be configured to be one or more other AFs or MTC providers, and the fifth node 115 may be configured to be a UDR.

The fifth node 115 is configured to, e.g., by means of a receiving unit 1101 within the fifth node 115 configured to, receive, the one or more second indications from the first node 111 configured to operate in the communications system 100. The one or more second indications are configured to indicate the one or more respective authorizations of the one or more third nodes 113 to perform the one or more actions with the group of devices 130. The one or more third nodes 113 are configured to be different than the fourth node 114 configured to operate in the communications system 100. The fourth node 114 has created the group of devices 130.

The fifth node 115 is also configured to, e.g., by means of an updating unit 1102 within the fifth node 115 configured to, update the existing data for the group of devices 130 based on the one or more second indications configured to be received.

In some embodiments, the updating of the existing data based on the received one or more second indications may be configured to be performed without intervention of the operator having authorized the one or more respective authorizations.

In some embodiments, the receiving may be further configured to comprise receiving the one or more third indications. The one or more third indications may be configured to indicate the one or more authorizations of the fourth node 114 with the group of devices 130.

In some embodiments, the one or more actions may be configured to comprise at least one of: administering the group of devices 130, configuring the group of devices 130 and monitoring events of the group of devices 130.

In some embodiments, at least one of the following may apply. According to a first option, at least one of the one or more second indications may be configured to indicate the creation of or an update to the group of devices 130. According to a second option, at least one of the one or more second indications may be configured to indicate the identity of the members of the group of devices 130. According to a third option, each of the one or more second indications may be configured to indicate the respective action of the respective actions, and the respective one or more third nodes 113 configured to be authorized to perform the respective action.

In some embodiments, at least one of the following options may apply. According to a first option, the first node 111 may be configured to be a UDM node, the fourth node 114 may be configured to be an AF, or an MTC provider, the one or more third nodes 113 may be configured to be one or more other AFs or MTC providers and the fifth node 115 may be configured to be a UDR. According to a second option, each of the one or more second indications may be configured to be a Nudr_Group_Data_Update or a Nudr_DataRepository_Update message.

In some embodiments, the one or more respective authorizations may originate from the fourth node 114 configured to operate in the communications system 100, and the one or more second indications may be configured to be received with the proviso the one or more respective authorizations may be authorized.

In some embodiments, to update the existing data based on the one or more second indications configured to be received may be configured to comprise to store the one or more respective authorizations.

The embodiments herein may be implemented through one or more processors, such as a processor 1103 in the fifth node 115 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the fifth node 115. One such carrier may be in the form of a CD ROM disc. It is however feasible with other data carriers such as a memory stick. The computer program code may furthermore be provided as pure program code on a server and downloaded to the fifth node 115.

The fifth node 115 may further comprise a memory 1104 comprising one or more memory units. The memory 1104 is arranged to be used to store obtained information, store data, configurations, schedulings, and applications etc. to perform the methods herein when being executed in the fifth node 115.

In some embodiments, the fifth node 115 may receive information from, e.g., the first node 111, the second node 112, the one or more third nodes 113, the fourth node 114, the group of devices 130, and/or another node, through a receiving port 1105. In some examples, the receiving port 1105 may be, for example, connected to one or more antennas in the fifth node 115. In other embodiments, the fifth node 115 may receive information from another structure in the communications system 100 through the receiving port 1105. Since the receiving port 1105 may be in communication with the processor 1103, the receiving port 1105 may then send the received information to the processor 1103. The receiving port 1105 may also be configured to receive other information.

The processor 1103 in the fifth node 115 may be further configured to transmit or send information to e.g., the first node 111, the second node 112, the one or more third nodes 113, the fourth node 114, the group of devices 130, another node and/or another structure in the communications system 100, through a sending port 1106, which may be in communication with the processor 1103, and the memory 1104.

Those skilled in the art will also appreciate that the units 1101-1102 described above may refer to a combination of analog and digital circuits, and/or one or more processors configured with software and/or firmware, e.g., stored in memory, that, when executed by the one or more processors such as the processor 1103, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The units 1101-1102 described above may be the processor 1103 of the fifth node 115, or an application running on such processor.

Thus, the methods according to the embodiments described herein for the fifth node 115 may be respectively implemented by means of a computer program 1107 product, comprising instructions, i.e., software code portions, which, when executed on at least one processor 1103, cause the at least one processor 1103 to carry out the actions described herein, as performed by the fifth node 115. The computer program 1107 product may be stored on a computer-readable storage medium 1108. The computer-readable storage medium 1108, having stored thereon the computer program 1107, may comprise instructions which, when executed on at least one processor 1103, cause the at least one processor 1103 to carry out the actions described herein, as performed by the fifth node 115. In some embodiments, the computer-readable storage medium 1108 may be a non-transitory computer-readable storage medium, such as a CD ROM disc, a memory stick, or stored in the cloud space. In other embodiments, the computer program 1107 product may be stored on a carrier containing the computer program, wherein the carrier is one of an electronic signal, optical signal, radio signal, or the computer-readable storage medium 1108, as described above.

The fifth node 115 may comprise an interface unit to facilitate communications between the fifth node 115 and other nodes or devices, e.g., the first node 111, the second node 112, the one or more third nodes 113, the fourth node 114, the group of devices 130, another node and/or another structure in the communications system 100. In some particular examples, the interface may, for example, include a transceiver configured to transmit and receive radio signals over an air interface in accordance with a suitable standard.

In other embodiments, the fifth node 115 may comprise the following arrangement depicted in FIG. 11*b*. The fifth node 115 may comprise a processing circuitry 1103, e.g., one or more processors such as the processor 1103, in the fifth node 115 and the memory 1104. The fifth node 115 may also comprise a radio circuitry 1109, which may comprise e.g., the receiving port 1105 and the sending port 1106. The processing circuitry 1103 may be configured to, or operable to, perform the method actions according to FIG. 5 and/or FIG. 7, in a similar manner as that described in relation to FIG. 11*a*. The radio circuitry 1109 may be configured to set up and maintain at least a wireless connection with the first node 111, the second node 112, the one or more third nodes 113, the fourth node 114, the group of devices 130, another node and/or another structure in the communications system 100.

Hence, embodiments herein also relate to the fifth node 115 operative for handling indications, the fifth node 115 being operative to operate in the communications system 100. The fifth node 115 may comprise the processing circuitry 1103 and the memory 1104, said memory 1104 containing instructions executable by said processing circuitry 1103, whereby the fifth node 115 is further operative to perform the actions described herein in relation to the fifth node 115, e.g., in FIG. 5 and/or FIG. 7.

Figure 12:
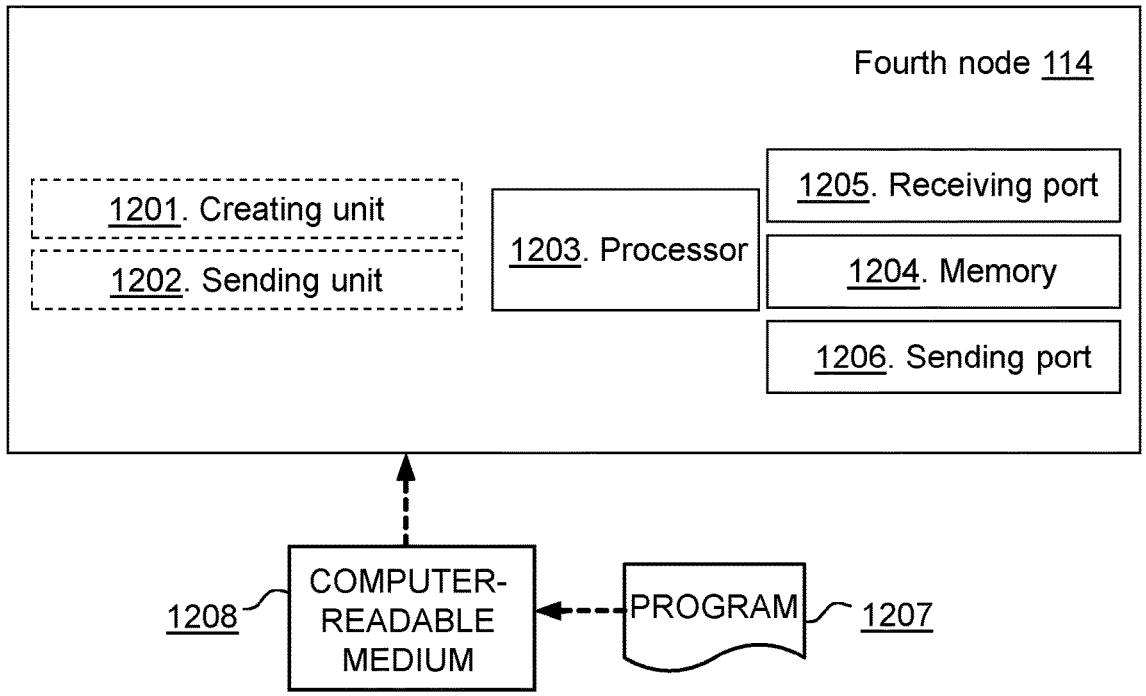
FIG. 12 is a schematic block diagram illustrating two non-limiting examples, a) and b), of a fourth node, according to embodiments herein.
Figure 12:
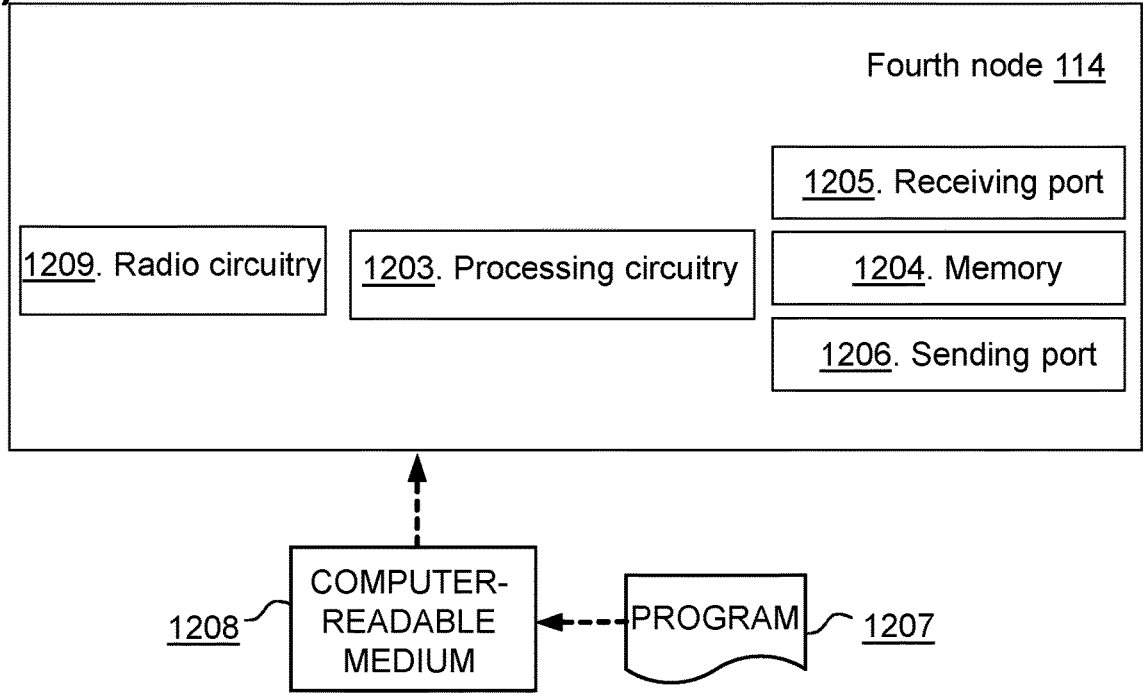

FIG. 12 depicts two different examples in panels a) and b), respectively, of the arrangement that the fourth node 114 may comprise to perform the method actions described above in relation to FIG. 6 and/or FIG. 7. In some embodiments, the fourth node 114 may comprise the following arrangement depicted in FIG. 12*a*. The fourth node 114 may be understood to be for handling indications. The fourth node 114 is configured to operate in the communications system 100.

Several embodiments are comprised herein. Components from one embodiment may be tacitly assumed to be present in another embodiment and it will be obvious to a person skilled in the art how those components may be used in the other exemplary embodiments. In FIG. 12, optional boxes are indicated by dashed lines. The detailed description of some of the following corresponds to the same references provided above, in relation to the actions described for the fourth node 114 and will thus not be repeated here. For example, the fourth node 114 may be configured to be an AF, or an MTC provider, the second node 112 may be configured to be a NEF, and the one or more third nodes 113 may be configured to be one or more other AFs or MTC providers.

The fourth node 114 is configured to, e.g., by means of a creating unit 1201 within the fourth node 114 configured to, create the group of devices 130.

The fourth node 114 is also configured to, e.g., by means of a sending unit 1202 within the fourth node 114 configured to, send, the one or more previous indications to the second node 112 configured to operate in the communications system 100. The one or more previous indications are configured to indicate the one or more respective authorizations of the one or more third nodes 113 to perform the one or more actions with the group of devices 130 configured to be created. The one or more third nodes 113 are configured to be different than the fourth node 114.

The sending of the one or more previous indications may be configured to be performed without intervention of the operator having authorized the one or more respective authorizations.

In some embodiments, the fourth node 114 may be configured to receive the confirmation that the group has been created with the authorizations configured to be requested, in the absence of the intervention of the operator having authorized the one or more respective authorizations.

In some embodiments, the sending may be further configured to comprise sending the one or more third indications. The one or more third indications may be configured to indicate the one or more authorizations of the fourth node 114 with the group of devices 130.

In some embodiments, the one or more actions may be configured to comprise at least one of: administering the group of devices 130, configuring the group of devices 130 and monitoring events of the group of devices 130.

In some embodiments, at least one of the following may apply. According to a first option, at least one of the one or more previous indications may be configured to indicate the creation of the group of devices 130. According to a second option, at least one of the one or more previous indications may be configured to indicate the identity of the members of the group of devices 130. According to a third option, at least one of the one or more previous indications may be configured to indicate the respective action of the respective actions, and the respective one or more third nodes 113 configured to be authorized to perform the respective action.

In some embodiments, at least one of the following options may apply. According to a first option the fourth node 114 may be configured to be an AF, or an MTC provider, the second node 112 may be configured to be a NEF and the one or more third nodes 113 may be configured to be one or more other AFs or MTC providers. According to a second option, each of the one or more previous indications may be configured to be a Nnef_parameterProvision_Create message or a Nnef_parameterProvision_Update message.

The embodiments herein may be implemented through one or more processors, such as a processor 1203 in the fourth node 114 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the fourth node 114. One such carrier may be in the form of a CD ROM disc. It is however feasible with other data carriers such as a memory stick. The computer program code may furthermore be provided as pure program code on a server and downloaded to the fourth node 114.

The fourth node 114 may further comprise a memory 1204 comprising one or more memory units. The memory 1204 is arranged to be used to store obtained information, store data, configurations, schedulings, and applications etc. to perform the methods herein when being executed in the fourth node 114.

In some embodiments, the fourth node 114 may receive information from, e.g., the first node 111, the second node 112, the one or more third nodes 113, the fifth node 115, the group of devices 130, and/or another node through a receiving port 1205. In some examples, the receiving port 1205 may be, for example, connected to one or more antennas in the fourth node 114. In other embodiments, the fourth node 114 may receive information from another structure in the communications system 100 through the receiving port 1205. Since the receiving port 1205 may be in communication with the processor 1203, the receiving port 1205 may then send the received information to the processor 1203. The receiving port 1205 may also be configured to receive other information.

The processor 1203 in the fourth node 114 may be further configured to transmit or send information to e.g., the first node 111, the second node 112, the one or more third nodes 113, the fifth node 115, the group of devices 130, another node and/or another structure in the communications system 100, through a sending port 1206, which may be in communication with the processor 1203, and the memory 1204.

Those skilled in the art will also appreciate that any of the units 1201-1202 described above may refer to a combination of analog and digital circuits, and/or one or more processors configured with software and/or firmware, e.g., stored in memory, that, when executed by the one or more processors such as the processor 1203, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 1201-1202 described above may be the processor 1203 of the fourth node 114, or an application running on such processor.

Thus, the methods according to the embodiments described herein for the fourth node 114 may be respectively implemented by means of a computer program 1207 product, comprising instructions, i.e., software code portions, which, when executed on at least one processor 1203, cause the at least one processor 1203 to carry out the actions described herein, as performed by the fourth node 114. The computer program 1207 product may be stored on a computer-readable storage medium 1208. The computer-readable storage medium 1208, having stored thereon the computer program 1207, may comprise instructions which, when executed on at least one processor 1203, cause the at least one processor 1203 to carry out the actions described herein, as performed by the fourth node 114. In some embodiments, the computer-readable storage medium 1208 may be a non-transitory computer-readable storage medium, such as a CD ROM disc, a memory stick, or stored in the cloud space. In other embodiments, the computer program 1207 product may be stored on a carrier containing the computer program, wherein the carrier is one of an electronic signal, optical signal, radio signal, or the computer-readable storage medium 1208, as described above.

The fourth node 114 may comprise an interface unit to facilitate communications between the fourth node 114 and other nodes or devices, e.g., the first node 111, the second node 112, the one or more third nodes 113, the fifth node 115, the group of devices 130, another node and/or another structure in the communications system 100. In some particular examples, the interface may, for example, include a transceiver configured to transmit and receive radio signals over an air interface in accordance with a suitable standard.

In other embodiments, the fourth node 114 may comprise the following arrangement depicted in FIG. 12b. The fourth node 114 may comprise a processing circuitry 1203, e.g., one or more processors such as the processor 1203 in the fourth node 114, and the memory 1204. The fourth node 114 may also comprise a radio circuitry 1209, which may comprise e.g., the receiving port 1205 and the sending port 1206. The processing circuitry 1203 may be configured to, or operable to, perform the method actions according to FIG. 6 and/or FIG. 7, in a similar manner as that described in relation to FIG. 12a. The radio circuitry 1209 may be configured to set up and maintain at least a wireless connection with the first node 111, the second node 112, the one or more third nodes 113, the fifth node 115, the group of devices 130, another node and/or another structure in the communications system 100.

Hence, embodiments herein also relate to the fourth node 114 operative for handling indications, the fourth node 114 being operative to operate in the communications system 100. The fourth node 114 may comprise the processing circuitry 1203 and the memory 1204, said memory 1204 containing instructions executable by said processing circuitry 1203, whereby the fourth node 114 is further operative to perform the actions described herein in relation to the fourth node 114, e.g., in FIG. 6 and/or FIG. 7.

When using the word "comprise" or "comprising", it shall be interpreted as non-limiting, i.e., meaning "consist at least of".

The embodiments herein are not limited to the above-described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Any of the terms processor and circuitry may be understood herein as a hardware component.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

The invention claimed is:

1. A computer-implemented method, performed by a first node, for handling indications, the first node operating in a communications system, the method comprising:
   receiving one or more first indications from a second node operating in the communications system, the one or more first indications indicating one or more respective authorizations of one or more third nodes to perform one or more actions with a group of devices, the one or more third nodes being different than a fourth node operating in the communications system, the fourth node having created the group of devices;
   sending, based on the received one or more first indications, one or more second indications to a fifth node operating in the communications system, the one or more second indications indicating to store the one or more respective authorizations;
   sending one or more third indications to the fifth node, the one or more third indications indicating one or more authorizations of the fourth node with the group of devices; and
   the sending of the one or more second indications being performed without intervention of an operator having authorized the one or more respective authorizations.

2. The computer-implemented method according to claim 1, wherein the one or more actions comprise at least one of: administering the group of devices, configuring the group of devices and monitoring events of the group of devices.

3. The computer-implemented method according to claim 1, wherein at least one of:
   a. at least one of the one or more first indications or the second indications indicates a creation of the group of devices;
   b. at least one of the one or more first indications or the one or more second indications indicates an identity of the members of the group of devices;
   c. at least one of the one or more first indications indicates respective actions, of the one or more actions, the one or more third nodes are respectively authorized to perform; and
   d. each of the one or more second indications indicates a respective action of the respective actions, and respective one or more third nodes authorized to perform the respective action.

4. The computer-implemented method according to claim 1, wherein at least one of:
   a. the first node is a Unified Data Management, UDM, node, the second node is a Network Exposure Function, NEF, the fourth node is an Application Function, AF, or a Machine Type Communication, MTC, provider, the one or more third nodes are one or more other Application Functions, AFs, or MTC providers, and the fifth node (115) is a Unified Data Repository, UDR;
   b. each of the one or more first indications is a Nudm_parameterProvision_Create message or a Nudm_ParameterProvision_Update message; and c. each of the one or more second indications is a Nudr_Group_Data_Update or a Nudr_DataRepository_Update.

5. The computer-implemented method according to claim 1, wherein the one or more respective authorizations originate from the fourth node operating in the communications system, and wherein the method further comprises:
   determining whether or not the fourth node is authorized to update authorizations for the group of devices, and, with the proviso the fourth node is determined to be authorized; and
   authorizing to update authorizations for the group of devices with the one or more respective authorizations, and wherein the one or more second indications are sent with the proviso the one or more respective authorizations are authorized.

6. The computer-implemented method according to claim 1, wherein to store the one or more respective authorizations comprises to update existing data for the group of devices at the fifth node.

7. A computer-implemented method, performed by a second node, for handling indications, the second node operating in a communications system, the method comprising:
   receiving one or more previous indications from a fourth node operating in the communications system, the one or more previous indications indicating one or more respective authorizations of one or more third nodes to perform one or more actions with a group of devices, the one or more third nodes being different than the fourth node having created the group of devices;
   sending, based on the received one or more previous indications, one or more first indications to a first node operating in the communications system, the one or more first indications indicating the one or more respective authorizations;
   sending one or more third indications to the first node, the one or more third indications indicating one or more authorizations of the fourth node with the group of devices; and
   the sending of the one or more first indications being performed without intervention of an operator having authorized the one or more respective authorizations.

8. The computer-implemented method according to claim 7, wherein the one or more actions comprise at least one of: administering the group of devices, configuring the group of devices and monitoring events of the group of devices.

9. The computer-implemented method according to claim 7, wherein at least one of:
   a. at least one of the one or more previous indications or the one or more first indications indicates a creation of the group of devices; and
   b. at least one of the one or more previous indications or the one or more first indications indicates an identity of the members of the group of devices, and respective actions, of the one or more actions, the one or more third nodes are respectively authorized to perform.

10. The computer-implemented method according to claim 7, wherein at least one of:
   a. the first node is a Unified Data Management, UDM, node, the second node is a Network Exposure Function, NEF, the fourth node is an Application Function, AF, or a Machine Type Communication, MTC, provider, and the one or more third nodes are one or more other Application Functions, AFs, or MTC Providers;
   b. each of the one or more first indications is a Nudm_parameterProvision_Create message or a Nudm_ParameterProvision_Update message; and
   c. each of the one or more previous indications is a Nnef_parameterProvision_Create message or a Nnef_parameterProvision_Update message.

11. The computer-implemented method according to claim 7, wherein the method further comprises:
   determining whether or not the fourth node is authorized to update authorizations, and, with the proviso the fourth node is determined to be authorized;
   authorizing to update authorizations with the one or more respective authorizations, and wherein the one or more first indications are sent with the proviso the one or more respective authorizations are authorized.

12. A first node, for handling indications, the first node being configured to operate in a communications system, the first node being further configured to:
   receive one or more first indications from a second node configured to operate in the communications system, the one or more first indications being configured to indicate one or more respective authorizations of one or more third nodes to perform one or more actions with a group of devices, the one or more third nodes being configured to be different than a fourth node configured to operate in the communications system, the fourth node being configured to have created the group of devices;
   send, based on the received one or more first indications, one or more second indications to a fifth node configured to operate in the communications system, the one or more second indications being configured to indicate to store the one or more respective authorizations;
   send one or more third indications to the fifth node, the one or more third indications being configured to indicate one or more authorizations of the fourth node with the group of devices; and
   the sending of the one or more second indications being configured to be performed without intervention of an operator having authorized the one or more respective authorizations.

13. The first node according to claim 12, wherein the one or more actions are configured to comprise at least one of:
   administering the group of devices, configuring the group of devices and monitoring events of the group of devices.

14. The first node according to claim 12, wherein at least one of:
   a. at least one of the one or more first indications or the second indications is configured to indicate a creation of the group of devices;
   b. at least one of the one or more first indications or the one or more second indications is configured to indicate an identity of the members of the group of devices;
   c. at least one of the one or more first indications is configured to indicate respective actions, of the one or more actions, the one or more third nodes are respectively configured to be authorized to perform; and
   d. each of the one or more second indications is configured to indicate a respective action of the respective actions, and respective one or more third nodes configured to be authorized to perform the respective action.

15. The first node according to claim 12, wherein the one or more respective authorizations are configured to originate from the fourth node operating in the communications system, and wherein the first node is further configured to:

determine whether or not the fourth node is authorized to update authorizations for the group of devices, and, with the proviso the fourth node is determined to be authorized; and authorize to update authorizations for the group of devices with the one or more respective authorizations, and wherein the one or more second indications are configured to be sent with the proviso the one or more respective authorizations are authorized.

16. The first node according to claim 12, wherein to store the one or more respective authorizations is configured to comprise to update existing data for the group of devices at the fifth node.

17. A second node, for handling indications, the second node being configured to operate in a communications system, the second node being further configured to:

receive one or more previous indications from a fourth node configured to operate in the communications system, the one or more previous indications being configured to indicate one or more respective authorizations of one or more third nodes to perform one or more actions with a group of devices, the one or more third nodes being configured to be different than the fourth node having created the group of devices;

send, based on the one or more previous indications configured to be received, one or more first indications to a first node configured to operate in the communications system, the one or more first indications being configured to indicate the one or more respective authorizations; and send one or more third indications to the first node, the one or more third indications being configured to indicate one or more authorizations of the fourth node with the group of devices, the sending of the one or more first indications being configured to be performed without intervention of an operator having authorized the one or more respective authorizations.

18. The second node according to claim 17, wherein the one or more actions are configured to comprise at least one of:

administering the group of devices, configuring the group of devices and monitoring events of the group of devices.

19. The second node according to claim 17, wherein at least one of:

a. at least one of the one or more previous indications or the one or more first indications is configured to indicate a creation of the group of devices; and b. at least one of the one or more previous indications or the one or more first indications is configured to indicate an identity of the members of the group of devices, and respective actions, of the one or more actions, the one or more third nodes are respectively configured to be authorized to perform.

20. The second node according to claim 17, wherein the second node is further configured to:

determine whether or not the fourth node is authorized to update authorizations, and, with the proviso the fourth node is determined to be authorized; and authorize to update authorizations with the one or more respective authorizations, and wherein the one or more first indications are configured to be sent with the proviso the one or more respective authorizations are authorized.

* * * * *